United States Patent
Xia et al.

(10) Patent No.: US 11,429,447 B2
(45) Date of Patent: Aug. 30, 2022

(54) SCHEDULING REGIONS OF A FIELD PROGRAMMABLE GATE ARRAY AS VIRTUAL DEVICES

(71) Applicant: Huawei Technologies Co., Ltd., Shenzhen (CN)

(72) Inventors: Tian Xia, Shenzhen (CN); Zhe Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 9 days.

(21) Appl. No.: 16/984,956

(22) Filed: Aug. 4, 2020

(65) Prior Publication Data
US 2020/0364091 A1 Nov. 19, 2020

Related U.S. Application Data

(63) Continuation of application No. PCT/CN2018/117949, filed on Nov. 28, 2018.

(30) Foreign Application Priority Data

Feb. 13, 2018 (CN) .......................... 201810153338.9

(51) Int. Cl.
*G06F 9/50* (2006.01)
*G06F 9/48* (2006.01)
*G06F 9/54* (2006.01)

(52) U.S. Cl.
CPC .......... *G06F 9/5027* (2013.01); *G06F 9/4881* (2013.01); *G06F 9/5066* (2013.01); *G06F 9/542* (2013.01); *G06F 2209/508* (2013.01)

(58) Field of Classification Search
CPC .... G06F 9/5027; G06F 9/4881; G06F 9/5066; G06F 9/542; G06F 2209/508
See application file for complete search history.

(56) References Cited

U.S. PATENT DOCUMENTS 9,100,012 B1 8/2015 Chen et al.
10,404,470 B2 * 9/2019 Hoppert .................... H04L 9/14
(Continued)

FOREIGN PATENT DOCUMENTS

CN 101727423 B 12/2011
CN 105306241 A 2/2016
(Continued)

OTHER PUBLICATIONS

Bin Zhang:"Study and Implementation of Virtualized Platform for CPU/FPGA Reconfigurable System", Northeastern University, Jun. 2011, 78 pages. With partial English translation.

*Primary Examiner* — Benjamin C Wu
(74) *Attorney, Agent, or Firm* — Conley Rose, P.C.

(57) ABSTRACT

A resource scheduling method, to improve resource utilization of a field-programmable gate array (FPGA) device, includes receiving a resource scheduling request from a host, where the resource scheduling request requests to schedule a partial region (PR) on the FPGA device to serve a first virtual device (VD) of the host, the FPGA device includes N PRs, the host includes M VDs, each of the M VDs is configured corresponding to one virtual machine (VM), the first VD is one of the M VDs, and both N and M are integers greater than one, obtaining context content of the first VD based on the resource scheduling request, determining a target PR in the N PRs, and deploying the context content of the first VD in the target PR.

20 Claims, 15 Drawing Sheets

(56) References Cited

U.S. PATENT DOCUMENTS

| | | | |
|---|---|---|---|
| 10,540,506 B2* | 1/2020 | Hoppert | G06F 15/7871 |
| 2014/0215424 A1* | 7/2014 | Fine | G06F 30/34 |
| | | | 716/117 |
| 2016/0154681 A1 | 6/2016 | Chen et al. | |
| 2016/0321113 A1* | 11/2016 | Pinto | G06F 9/45558 |
| 2017/0126487 A1 | 5/2017 | Xie et al. | |
| 2018/0196951 A1* | 7/2018 | Hoppert | G06F 9/45558 |
| 2018/0205553 A1* | 7/2018 | Hoppert | G06F 21/12 |
| 2018/0321985 A1* | 11/2018 | Kakaiya | G06F 15/76 |
| 2018/0357090 A1* | 12/2018 | Butcher | G06F 9/45558 |
| 2019/0042329 A1* | 2/2019 | Kakaiya | G06F 9/5088 |
| 2019/0107965 A1* | 4/2019 | Deval | G06F 11/2023 |
| 2019/0361728 A1* | 11/2019 | Kumar | H04L 67/34 |
| 2020/0050480 A1* | 2/2020 | Cao | G06F 9/45558 |
| 2020/0241899 A1* | 7/2020 | Al-Aghbari | G06F 30/34 |

FOREIGN PATENT DOCUMENTS

| | | |
|---|---|---|
| CN | 105335211 A | 2/2016 |
| CN | 105700956 A | 6/2016 |
| EP | 3089035 A1 | 11/2016 |

\* cited by examiner

SCHEDULING REGIONS OF A FIELD PROGRAMMABLE GATE ARRAY AS VIRTUAL DEVICES

CROSS-REFERENCE TO RELATED APPLICATIONS

This application is a continuation of International Patent Application No. PCT/CN2018/117949 filed on Nov. 28, 2018, which claims priority to Chinese Patent Application No. 201810153338.9 filed on Feb. 13, 2018. The disclosures of the aforementioned applications are hereby incorporated by reference in their entireties.

TECHNICAL FIELD

This application relates to the communications field, and in particular, to a resource scheduling method and apparatus, a device, and a system.

BACKGROUND

In recent years, with the progress of big data analysis and artificial intelligence, data center users have a rapidly increasing requirement on a computing capability of a processor. In scenarios such as deep learning, complex data analysis, and encrypted computing, a device such as a field-programmable gate array (FPGA) device is usually used to accelerate a specific computing task. An FPGA technology has inherent advantages in the foregoing computing field, and can be optimized based on a computing scenario and an algorithm, to provide a higher computing capability with lower power consumption.

Currently, a mainstream solution in which an FPGA device is provided for a tenant as a cloud service is that the FPGA device is directly exposed to a tenant virtual machine (VM) as a high-speed Peripheral Component Interconnect Express (PCIe) device, and a tenant is allowed to fully control the FPGA device. This solution uses a device pass-through technology to provide tenants with higher data exchange bandwidth and higher user freedom. In this solution, although device performance is ensured using the pass-through technology, resources of the FPGA device cannot be fully used, and the resources of the entire FPGA device can be exclusively used by only one tenant, and consequently resource utilization of the FPGA device is relatively low.

SUMMARY

Embodiments of this application provide a resource scheduling method and apparatus, a device, and a system, to improve resource utilization of an FPGA device.

According to a first aspect, an embodiment of this application provides a resource scheduling method, where the method is applied to an FPGA device. The method includes as follows.

There are N reconfigurable regions (partial region (PR)) obtained through division on the FPGA device. The PRs are used to provide a computing function service for M virtual devices (VDs) on a host. VMs configured corresponding to the M VDs are deployed on the host. When a first VM runs, a first VD configured for the first VM needs to be used, and the host requests the FPGA device to schedule a PR for the first VD to serve the first VD, where both N and M are integers greater than 1, and N is less than M.

The FPGA device receives a resource scheduling request sent by the host, and then obtains context content of the first VD based on the resource scheduling request. The context content of the first VD may include content such as data of a service to be run by the first VD. Then, the FPGA device determines, in the N PRs, a target PR used to serve the first VD, and deploys the context content of the first VD in the target PR.

In this way, when the host schedules a resource of the FPGA device for the VM, the VM no longer exclusively occupies the entire FPGA device, and a plurality of PR resources of the FPGA device can be simultaneously scheduled for a plurality of VMs such that the resources of the FPGA device are shared, thereby improving resource utilization of the FPGA device.

In a possible implementation, K virtual function (VF) are further configured on the FPGA device, and the K VFs are used as external interfaces of the FPGA device. In this case, a correspondence between the M VDs on the host and the N PRs on the FPGA device includes a mapping relationship between the M VDs and the K VFs and a connection relationship between the K VFs and the N PRs.

In another possible implementation, the mapping relationship between the M VDs and the K VFs is a static mapping relationship. For example, M is equal to K, and the mapping relationship between the M VDs and the K VFs is a one-to-one mapping relationship. The connection relationship between the K VFs and the N PRs may be a dynamic connection relationship. That is, K and N are equal or may not be equal. For example, K is greater than N, and the connection relationship between the K VFs and the N PRs can be dynamically changed.

In another possible implementation, after the FPGA device deploys the context content of the first VD in the target PR, the FPGA device further connects the target PR to a first VF corresponding to the first VD. Based on the foregoing implementation, because the mapping relationship between the K VFs and the M VDs is a static mapping relationship, it indicates that the first VD has been connected to the first VF. In this way, the first VD may be connected to the target PR using the first VF such that the target PR is scheduled to serve the first VD.

In another possible implementation, the mapping relationship between the M VDs and the K VFs is a dynamic mapping relationship, M and K may or may not be equal, and the connection relationship between the M VDs and the K VFs can be dynamically changed. The connection relationship between the K VFs and the N PRs is a static connection relationship. For example, K may be equal to N, and the connection relationship between the K VFs and the N PRs is a one-to-one connection relationship.

In another possible implementation, after the FPGA device deploys the context content of the first VD in the target PR, the FPGA device may further notify the host to connect the first VD to a first VF corresponding to the target PR. Because the VF is an external interface of the FPGA device, after the FPGA device is connected to the host, the host controls a hot plug connection of the VF. Based on the foregoing implementation, when the connection relationship between the K VFs and the N PRs is a one-to-one connection relationship, it indicates that the target PR has been connected to the first VF. After the first VF is connected to the first VD, connection scheduling performed by the first VD on the target PR is implemented.

In another possible implementation, the mapping relationship between the M VDs and the K VFs is a dynamic mapping relationship, M and K may or may not be equal, and the connection relationship between the M VDs and the K VFs can be dynamically changed. The connection relationship between the K VFs and the N PRs is a dynamic connection relationship. For example, K is greater than N, and the connection relationship between the K VFs and the N PRs can be dynamically adjusted.

In another possible implementation, after the FPGA device deploys the context content of the first VD in the target PR, the FPGA device further connects the target PR to a first VF corresponding to the first VD, and notifies the host to connect the first VD to the first VF corresponding to the target PR. Because the connection relationship between the M VDs and the K VFs is uncertain, the relationship between the K VFs and the N PRs is also uncertain. After determining the target PR for the first VD, the FPGA device not only needs to connect the target PR to the VF, but also needs to notify the host to connect the first VD to the VF. When determining the VF that needs to be connected to the target PR, the FPGA device may determine the VF based on connection usage statuses of the K VFs. For example, if the first VF that is in an idle state and that is not connected to any PR exists in the K VFs, the FPGA device connects the target PR to the first VF, and notifies the host to connect the first VD to the first VF. In this way, connection scheduling between the first VD and the target PR is implemented.

In another possible implementation, determining of the target PR in the N PRs may be determining any PR in an idle state in the N PRs as the target PR, where the idle state is used to indicate a state in which a corresponding PR does not serve any one of the M VDs. In this implementation, if there is an idle PR on the FPGA device, any PR in the idle state is preferentially determined as the target PR.

In another possible implementation, determining of the target PR in the N PRs may be as follows.

When all the PRs are in a non-idle state (namely, a busy state), it indicates that each of all the PRs is serving a VD corresponding to the PR. In this case, based on priority values, a PR that is serving a second VD may be determined as the target PR. A priority value of the second VD is less than a priority value of the first VD.

Optionally, when all the N PRs are in the busy state and the second VD whose priority value is less than the priority value of the first VD does not exist, a state of the first VD is set to a waiting state and the priority value of the first VD is updated based on waiting duration, where the priority value of the first VD boosts as the waiting duration of the first VD increases.

When a PR in the idle state exists in the N PRs, the PR in the idle state is preferentially determined as the target PR. When a PR in the idle state does not exist in the N PRs, but the priority value of the first VD is greater than the priority value of the second VD as the waiting duration of the first VD increases, the PR that serves the second VD is determined as the target PR.

Optionally, that the priority value of the first VD is greater than the priority value of the second VD in the foregoing description may include that the priority value of the first VD minus a preemption cos t correction value is greater than the priority value of the second VD. In another expression, that the priority value of the second VD is less than the priority value of the first VD may be a sum of the priority value of the second VD and a preemption cos t correction value is less than the priority value of the first VD. The preemption cos t correction value is used to indicate overheads required by the first VD to preempt the PR. For example, duration required by the first VD to preempt the PR is quantized to obtain an overhead value. When the PR of the second VD needs to be preempted for the first VD, even if the priority value of the first VD is equal to the priority value of the second VD, because the first VD needs some overheads to preempt the PR, the PR of the second VD cannot be preempted for the first VD, and the PR of the second VD can be preempted for the first VD only when the priority value of the first VD minus a preemption cos t correction value quantized for the overheads is still greater than priority value of the second VD.

In this implementation, if all the PRs are in the busy state, the priority value of the first VD is compared with priority values of other VDs, and if the second VD whose priority value is lower than the priority value of the first VD exists in the other VDs, a second PR that serves the second VD is preempted for the first VD as the target PR. In this way, flexibility of PR resource scheduling is improved.

In another possible implementation, after the FPGA device determines the PR that serves the second VD as the target PR, the method further includes boosting the priority value of the first VD by a first preset threshold, and dropping the priority value of the second VD by a second preset threshold. In this way, the priority value of the second VD is suddenly dropped such that the priority value of the second VD does not quickly exceed a priority value of another VD that is waiting, the priority value of the first VD is suddenly boosted such that the PR of the first VD is not quickly preempted for the other VD that is waiting. Therefore, PR scheduling is fairer.

It should be noted that the priority value of the VD described in the foregoing implementations may be preset by the FPGA device. For example, the FPGA device sets a same priority value for each VD. When a PR resource needs to be scheduled for a VD, if there is an idle PR, a priority value of the VD does not need to be compared, and the idle PR may be directly scheduled for the VD. If all the PRs are in the busy state, the priority value of the VD is compared with a priority value of another VD. Because the priority value of the VD is still an initial value, the priority value definitely does not exceed the priority value of the other VD, and therefore the VD is set to a waiting state, and as waiting duration of the VD increases, the priority value of the VD gradually boosts. If an idle PR exists in a waiting process of the VD, the idle PR is scheduled for the VD, or if an idle PR does not exist, an updated priority value of the VD is compared, in real time, with priority values of other VDs that are using PRs, and if the priority value of the VD minus a preemption cos t correction value is greater than a priority value of any VD in the other VDs, a PR that is being used by another VD whose priority value is less than the priority value of the VD is preempted for the VD. After the PR is preempted for the VD, to avoid a case in which the VD is immediately preempted, a priority value of the VD is suddenly boosted by a specific value. To avoid a case in which a PR of another VD can be immediately preempted for the VD for which the PR has just been preempted, a priority value of the VD for which the PR has just been preempted is suddenly dropped by a specific value. In this way, PR scheduling is fairer.

In another possible implementation, after the FPGA device determines the PR that serves the second VD as the target PR, the method further includes stopping a PR service serving the second VD when the PR that serves the second VD runs to a preset check-point, where the preset check-point is a check-point of a logical algorithm path of a process that is run by the PR.

The preset check-point may be set based on an algorithm feature, and is defined as a phase node in an algorithm path, for example, ending of an operation of a group of data, or completion of a phase in a pipeline. In this case, most operation logic registers no longer store valid data. Therefore, PR logic at the check-point can completely store a device state by storing only a small quantity of register states, and data integrity damage caused by forcible termination of some operations is avoided. Setting a proper check-point can reduce a quantity of register states that need to be stored and ensure data integrity during PR switching.

In another possible implementation, before the FPGA device stops the PR service serving the second VD, the method further includes sending a preemption notification to the host, where the preemption notification is used to indicate that the PR that serves the second VD needs to be preempted as the target PR, and receiving indication information sent by the host, where the indication information is used to indicate that a VM configured corresponding to the second VD has suspended using the second VD.

Because the FPGA device needs to preempt the PR of the second VD for the first VD, the FPGA device further needs to notify the host such that the VM that is on the host and that is configured corresponding to the second VD first suspends using the second VD. After the VM that is configured corresponding to the second VD suspends using the second VD, the FPGA device switches the PR, that is, preempts the PR for the first VD. In this way, state synchronization between a host side and an FPGA device side is implemented.

According to a second aspect, an embodiment of this application provides a resource scheduling method, where the method is applied to a host. The method includes as follows.

There are N PRs obtained through division on an FPGA device. The PRs are used to provide a computing function service for M VDs on a host. VMs configured corresponding to the M VDs are deployed on the host. When a first VM runs, a first VD configured for the first VM needs to be used, and the host requests the FPGA device to schedule a PR for the first VD to serve the first VD, where both N and M are integers greater than 1, and N is less than M.

The host sends a resource scheduling request to the FPGA device, where the resource scheduling request is used to request to schedule a dynamic reconfigurable region PR on the FPGA device to serve the first VD. The host receives acknowledgment information from the FPGA device, where the acknowledgment information includes information indicating that context content of the first VD has been deployed in a target PR, the target PR is a PR scheduled by the FPGA device for the first VD. Then, the host notifies the first VM to run the first VD.

In this way, a resource of the FPGA device is scheduled for the VM, the VM no longer exclusively occupies the entire FPGA device, and a plurality of PR resources of the FPGA device can be simultaneously scheduled for a plurality of VMs such that the resources of the FPGA device are shared, thereby improving resource utilization of the FPGA device.

In a possible implementation, before the host receives the acknowledgment information from the FPGA device, the method further includes receiving, by the host, a preemption notification that is sent by the FPGA device and that indicates that a PR that serves a second VD needs to be preempted as the target PR, and sending, based on the preemption notification, suspend information to a VM configured corresponding to the second VD, where after receiving the suspend information, the VM suspends using the second VD.

Optionally, after suspending using the second VD, the VM configured corresponding to the second VD may further send suspend acknowledgment information to the host, and the host forwards the suspend acknowledgment information to the FPGA device. In this way, a case in which data of a same service on a host side is not synchronized with that on the FPGA device is avoided.

According to a third aspect, an embodiment of this application provides a resource scheduling apparatus. The apparatus has a function of implementing any one of the implementations of the first aspect or the second aspect. The function may be implemented by hardware, or may be implemented by hardware executing corresponding software. The hardware or the software includes one or more modules corresponding to the foregoing function.

According to a fourth aspect, an embodiment of this application provides a resource scheduling apparatus. The apparatus is an FPGA device, and the apparatus includes a processor and a memory. The processor and the memory are connected using a bus, the memory stores a computer instruction, and the processor is configured to implement any one of the implementations of the first aspect by executing the computer instruction.

According to a fifth aspect, an embodiment of this application provides a resource scheduling apparatus. The apparatus is a host, and the apparatus includes a processor and a memory. The processor and the memory are connected using a bus, the memory stores a computer instruction, and the processor is configured to implement any one of the implementations of the second aspect by executing the computer instruction.

According to a sixth aspect, an embodiment of this application provides a resource scheduling system. The system includes the FPGA device according to the fourth aspect and the host according to the fifth aspect.

According to a seventh aspect, an embodiment of this application provides a readable storage medium, and the storage medium stores a computer instruction used to implement any one of the implementations of the first aspect or the second aspect.

According to an eighth aspect, an embodiment of this application provides a computer program product, the computer program product includes a computer software instruction, and the computer software instruction may be loaded by a processor to implement a procedure in any one of the implementations of the first aspect or the second aspect.

According to a ninth aspect, an embodiment of this application provides a chip system, the chip system includes a processor and a memory, the processor is connected to the memory, and the processor may run an instruction stored in the memory, to enable the chip system to perform any one of the implementations of the first aspect or the second aspect.

According to a tenth aspect, an embodiment of this application provides an FPGA device. The device includes a scheduler and N PRs, where N is an integer greater than 1, the scheduler is connected to the N PRs using a circuit bus, and the scheduler is configured to implement any one of the implementations of the first aspect.

DESCRIPTION OF EMBODIMENTS

Embodiments of this application provide a resource scheduling method and apparatus, a device, and a system, to improve resource utilization of an FPGA device.

The following clearly describes the technical solutions in the embodiments of this application with reference to the accompanying drawings in the embodiments of this application. The described embodiments are merely some but not all of the embodiments of this application. In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances such that the embodiments described herein can be implemented in other orders than the order illustrated or described herein. Moreover, the terms "include", "contain" and any other variants mean to cover non-exclusive inclusion. For example, a process, method, system, product, or device that includes a list of steps or units is not necessarily limited to those units, but may include other units not expressly listed or inherent to such a process, method, system, product, or device.

Figure 1:
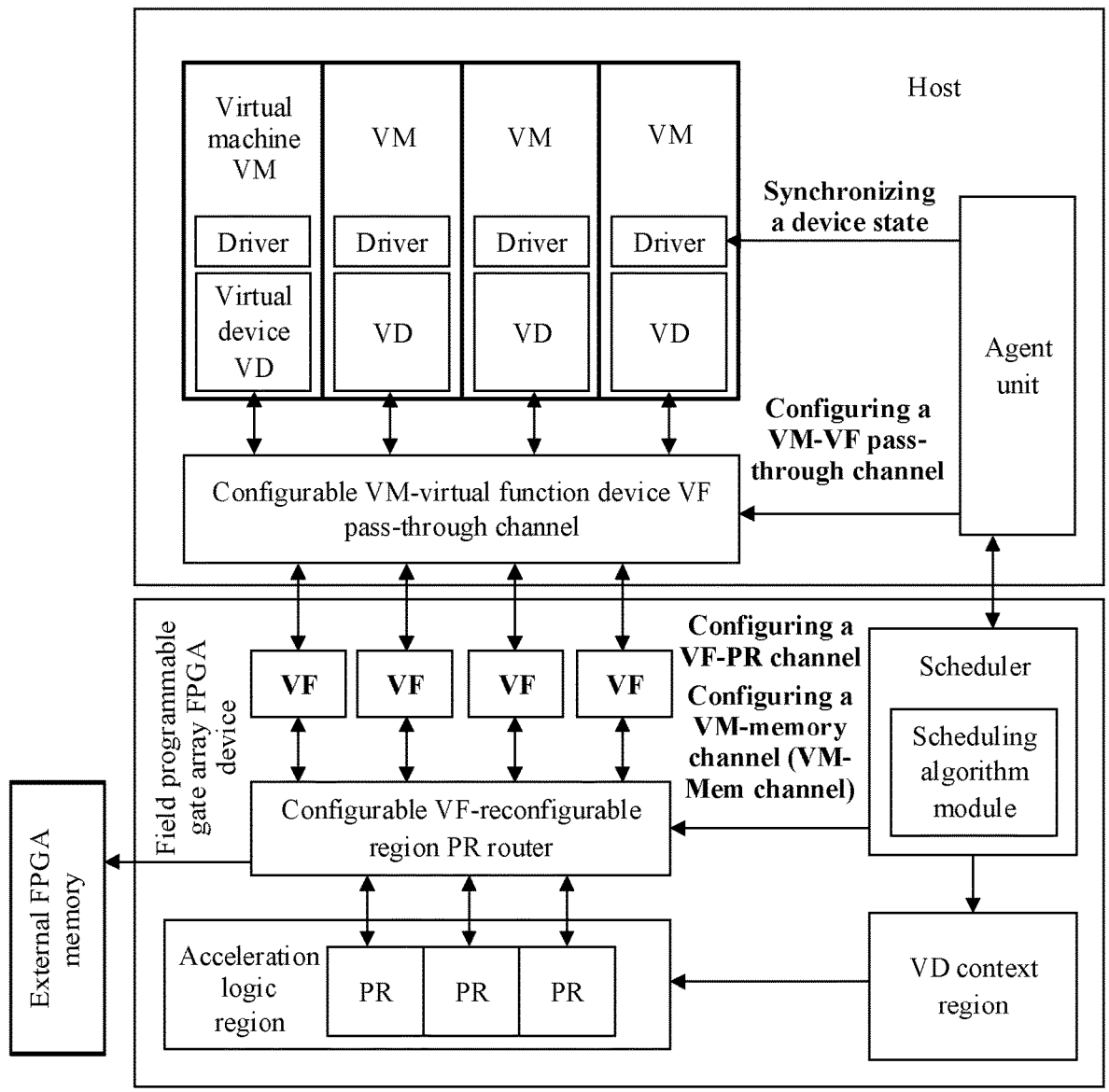
FIG. 1 is a schematic diagram of a system architecture to which a resource scheduling method is applied according to an embodiment of this application.

FIG. 1 is a schematic diagram of a system architecture to which a resource scheduling method is applied according to an embodiment of this application.

In FIG. 1, a host and an FPGA device are included. The host includes a plurality of tenant VMs and agent units (agent). The FPGA device includes a plurality of logical region (PR) resources obtained through division and a scheduler. In this application, hardware depends on a dynamic partial reconfiguration (DPR) technology provided by the FPGA device, and a computing logical region of the FPGA device is divided into dynamic reconfigurable PR resources. The PR resource is presented in a form of a VF unit using a single-root input/output (I/O) virtualization (SR-IOV) technology, and is used as an accelerator of the FPGA device and is passed through, using a VD, to a VM corresponding to the VD. The VM accesses the VD to schedule a corresponding PR resource for accelerating computing.

In this application, a plurality of tenants (i.e., VMs) share a PR resource, to be specific, the PR resource may be dynamically migrated and scheduled between VMs. For example, when a quantity of VMs is greater than a quantity of PR resources, efficient resource sharing and proper resource scheduling are implemented. The following describes functions of devices or units shown in FIG. 1.

Acceleration logical region is pre-divided into several reconfigurable logical regions PRs to perform actual heterogeneous computing tasks. The PR is a target object scheduled by the FPGA device in this application. A computing capability of the VD device in the VM needs to be implemented in the PR.

VD context regions (VD context blocks) are used to deploy a context of the VD device for the PR resource. The VD device can be stored/restored in different PR resources by switching the context without affecting use of the VD device.

External memory (external FPGA memory) is an external memory resource of the FPGA device. An application scenario of this application relates to heterogeneous acceleration scenarios such as machine learning and big data computing. Therefore, an additional storage device needs to be provided. Context content corresponding to each VD may be stored in the external memory, and calculation logic (bitstream) corresponding to a PR may also be stored in the external memory. It should be noted that relatively small data such as a value of a register, an identifier (ID) of a VD, and a register state in a context of the VD may be stored in an internal memory of the FPGA device, and relatively large data such as specific content of the context of the VD may be stored in the external memory of the FPGA device.

Configurable VF-PR router module as a part of a static logic circuit of the FPGA device, the configurable VF-PR router is responsible for establishing a channel between a VF and a PR and a channel (VF-Mem) between the VF and another resource, for example, a memory module, of the FPGA device. This module implements dynamic mapping between the PR resource and the VF that serves as a device interface.

Configurable VM-VF pass-through channel module is responsible for establishing a pass-through channel between a VM and a VF. This module implements, using a hot swap mechanism, dynamic mapping between the VM and the VF that serves as a device interface.

Scheduler as a hardware module, the scheduler manages the PR resource and the configurable VF-PR router in a unified manner. This component communicates with an agent process on a host side to implement a PR resource scheduling mechanism. This component includes a scheduling algorithm module for making a scheduling decision, and is also responsible for switching a VD context between PRs and configuring corresponding VF-PR and VF-Mem channels.

Agent unit (agent) as a process unit on the host side, the agent unit is responsible for communicating with a VD driver in the VM to synchronize a device state and communicating with the scheduler to schedule the PR resource. The agent is also responsible for configuring a pass-through relationship between the VF and the VM.

Driver module is a VD device driver deployed in the VM. This module manages a state of the VD device by communicating with the agent.

Figure 2:
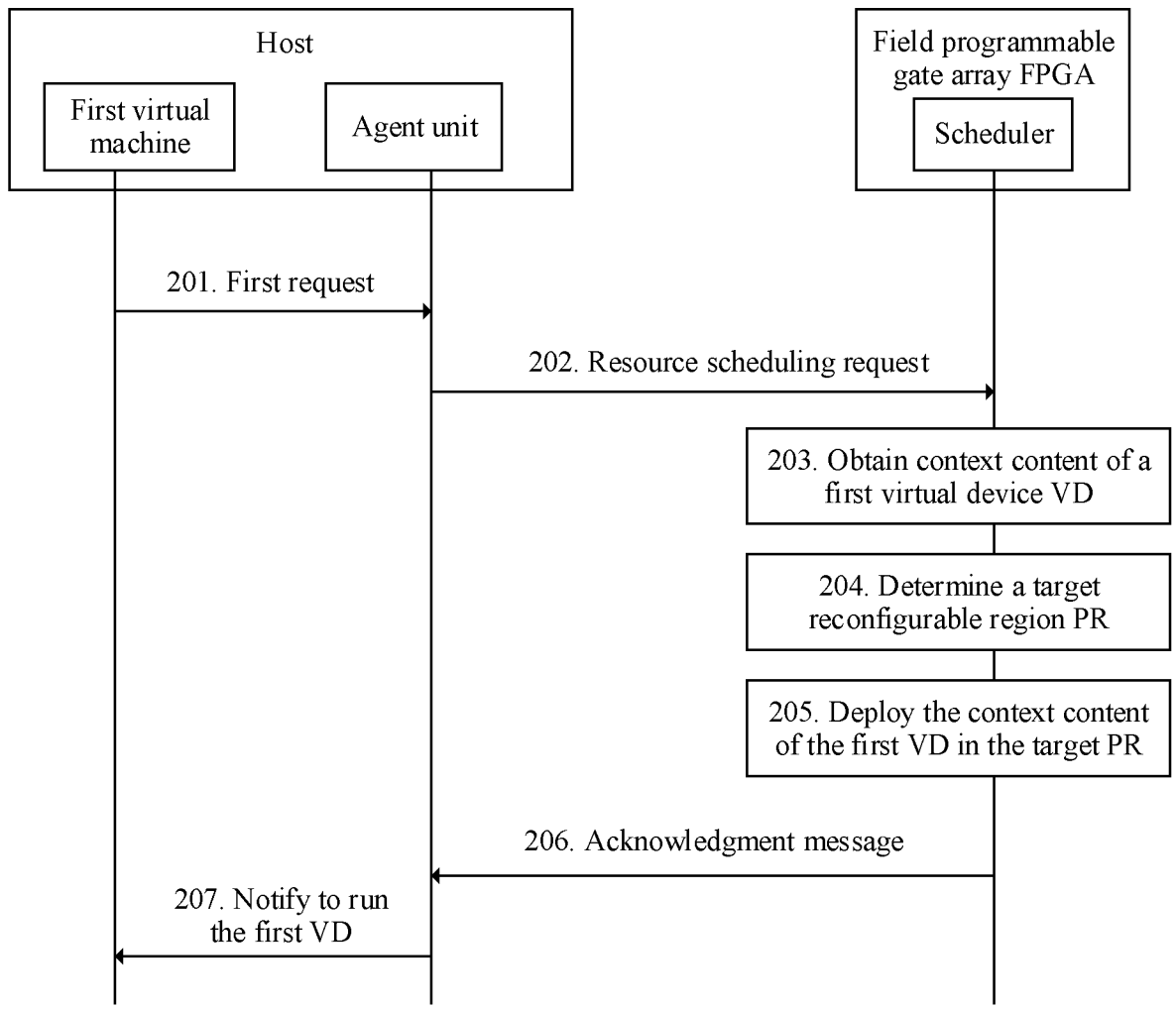
FIG. 2 is a schematic diagram of an embodiment of a resource scheduling method according to this application.

FIG. 2 is a schematic diagram of a resource scheduling method according to an embodiment of this application. In this embodiment, when a PR resource needs to be scheduled for a first VM, there is still an idle PR resource on an FPGA device. The following uses an example for description.

For ease of description, in this embodiment, objects on a host and the FPGA device in this application are divided in more detail. A plurality of VMs (including a first VM) and agent units are deployed on the host, and the FPGA device includes a scheduler and a plurality of PRs.

201: The first VM sends a first request to the agent unit. The agent unit receives the first request sent by the first VM.

When the first VM starts to use a first VD device, because a PR resource may not be bound to the first VD device, the first VD device is unavailable. To make the user not perceive that the first VD device is unavailable, in this case, the first VD device does not throw an exception, but suspends access by the first VM to the first VD device, and sends the first request to the agent unit, where the first request is used to request to schedule a computing resource (that is, a PR resource) for the first VD of the first VM.

202: The agent unit sends a resource scheduling request to the scheduler. The scheduler receives the resource scheduling request sent by the agent unit.

The resource scheduling request is used to request to schedule a PR to serve the first VD, and the FPGA device has N PRs that are obtained through division and provide a computing function for the VMs.

The resource scheduling request may be the first request sent by the first VM, and the agent unit implements a forwarding function. In a subsequent step, the agent unit cooperates with the scheduler to schedule the PR resource for the first VM.

203: The scheduler obtains context content of the first VD based on the resource scheduling request.

The resource scheduling request includes an identifier of the first VD, and the scheduler obtains the context content of the first VD from an external memory based on the identifier of the first VD. The context content includes a PR logic function corresponding to the first VD, a register state of PR logic, and a data state of the first VD.

Figure 3:
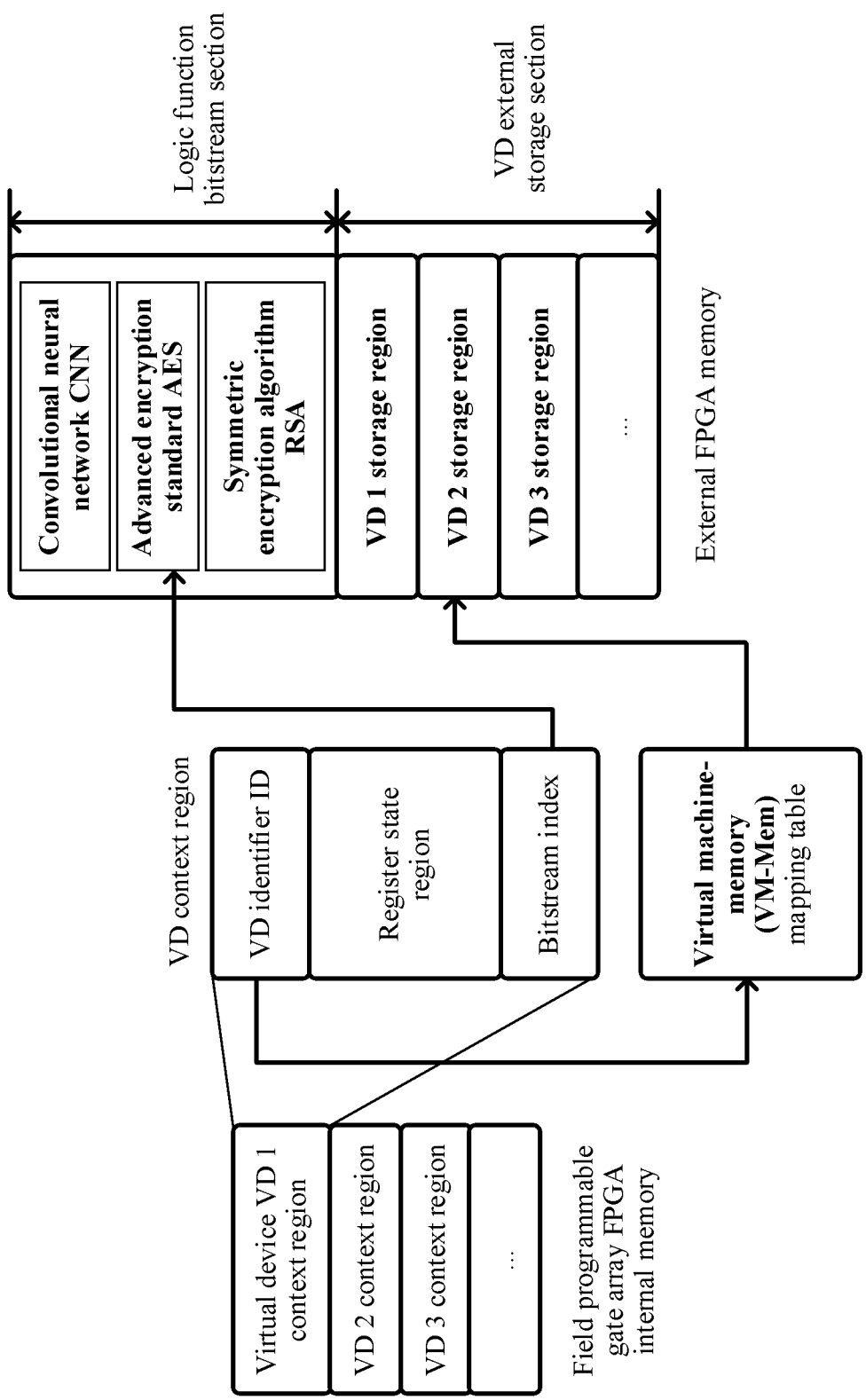
FIG. 3 is a schematic diagram of a data structure and storage of context content of a VD according to an embodiment of this application.

As shown in FIG. 3, a local memory of the FPGA device (FPGA internal memory) stores a structure of a corresponding VD context block for each VD. Each VD context block records a context environment in which a VD is running. A bitstream index corresponds to the PR logic function, and a register state region (register states) corresponds to the register state of the PR logic. At the same time, an external FPGA memory connected to the FPGA device is divided into a bitstream section (which stores a bitstream corresponding to the PR logic function) and a VD device external storage section (which is external storage space of the VD device). In FIG. 3, CNN represents a convolutional neural network (CNN), AES represents an advanced encryption standard (AES), and Rivest-Shamir-Adleman (RSA) represents an RSA encryption algorithm. The following separately describes in detail storing of the PR logic function, a data state in the memory, and the register state of the PR logic.

(1) Storing of the PR Logic Function:

The PR logic function is stored in the external FPGA memory in a form of a bitstream (which refers to a section in a VD context data structure and memory allocation: bitstream in FIG. 3), the PR logic function may be recorded by storing an index number of a bitstream file. In FIG. 3, the bitstream index in the VD context records that a logical function implemented by the VD is the AES. When a state of the VD device is restored later, logic of the AES is loaded from the external FPGA memory to the PR corresponding to the VD.

(2) Storing of the Data State in the Memory:

As shown in FIG. 3, in the solution of this application, independent memory space is allocated to each VD in the external FPGA memory (external memory). VD memory allocation is static and cannot be dynamically modified. Allocation information is stored in a static VD-Mem mapping table. Memory data of the VD can be accessed using a VD ID index. In this solution, only the VD-Mem mapping table needs to be maintained, to maintain independent data space for each VD, thereby avoiding memory copying overheads during device context switching.

Figure 4:
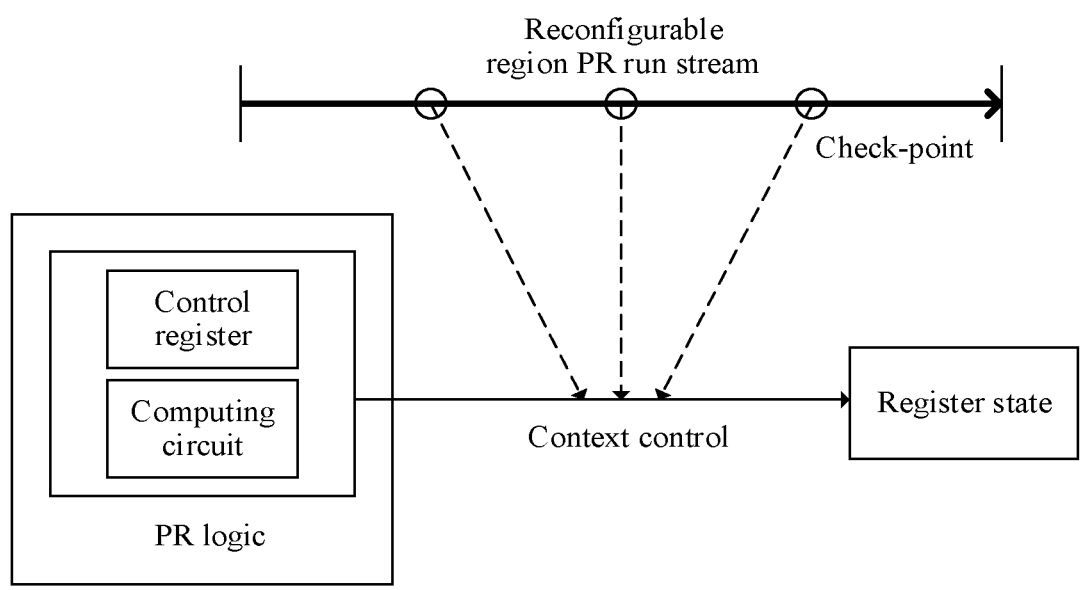
FIG. 4 is a schematic diagram of a preset check-point during PR running according to an embodiment of this application.

(3) Storing of the Register State of the PR Logic:

As shown in FIG. 4, a check-point is set in a logic algorithm path. When an operation of the PR logic needs to be interrupted in an operation process (for example, when a PR resource is preempted), the PR logic is not interrupted immediately, and the operation is interrupted and is allowed to be switched only when a nearest checkpoint is reached. The check-point is set based on an algorithm feature, and is defined as a phase node in an algorithm path, for example, ending of an operation of a group of data, or completion of a phase in a pipeline. In this case, most operation logic registers no longer store valid data. Therefore, the PR logic at the check-point can completely store a device state by storing only a small quantity of register states, and data integrity damage caused by forcible termination of some operations is avoided. Setting a proper check-point can reduce a quantity of register states that need to be stored and ensure data integrity during PR switching.

204: Determine a target PR.

The scheduler further needs to determine a target PR for the first VD. If there are idle PRs (that is, PRs that are not scheduled by other VDs) in the plurality of PRs on the FPGA device, the scheduler determines any idle PR as the target PR.

205: The scheduler deploys the context content of the first VD in the target PR.

After obtaining the context content of the first VD from the external memory, the scheduler deploys the context content in the VD context block of the first VD, and indicates the target PR to run content in the VD context block. In this way, deployment of the context content of the first VD in the target PR is completed.

206: The scheduler sends acknowledgment information to the agent unit. The agent unit receives the acknowledgment information sent by the scheduler.

The acknowledgment information includes information indicating that the context content of the first VD has been deployed in the target PR.

After completing deployment of the context content of the first VD in the target PR, the scheduler needs to notify the agent unit that the deployment has been completed.

207: The agent unit notifies the first VM to run the first VD.

After receiving the acknowledgment information, the agent unit may notify the first VM that the first VD can be used, to complete scheduling of the PR resource for the first VM.

In this embodiment of this application, a context of a VD device is defined and switched such that the plurality of PRs can be flexibly scheduled, thereby improving PR resource utilization.

Figure 5:
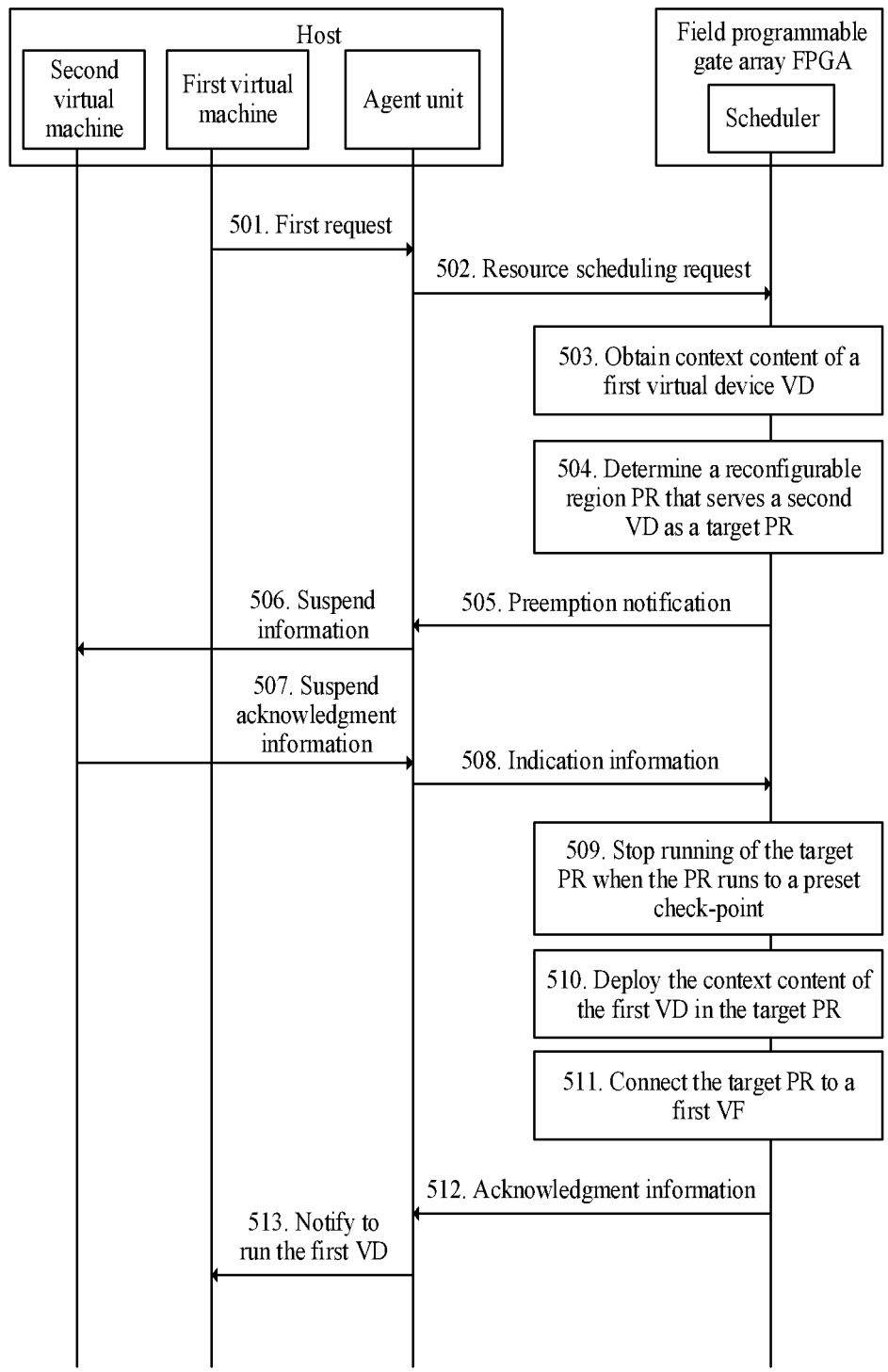
FIG. 5 is a schematic diagram of another embodiment of a resource scheduling method according to this application.

FIG. 5 shows another embodiment of a resource scheduling method according to this application. In this embodiment, when a PR resource is to be scheduled for a first VM, there is no idle PR resource. In the solution of this embodiment, a scheduling solution is set to complete PR resource scheduling for the first VM. The following uses an example for description.

Content of steps 501 to 503 is similar to content of steps 201 to 203 in the embodiment in FIG. 2, and details are not described herein again.

504: When all PRs are in a non-idle state, the scheduler determines a PR that serves a second VD as a target PR, where a priority value of the second VD is less than a priority value of the first VD.

Because a quantity of PRs is limited, when a plurality of VMs whose quantity is greater than the quantity of PRs need to be run, a VM for which a PR resource cannot be immediately scheduled may exist. To implement that a PR resource can be scheduled for each VM in this case, this application provides a scheduling solution. The following provides detailed descriptions.

Figure 6:
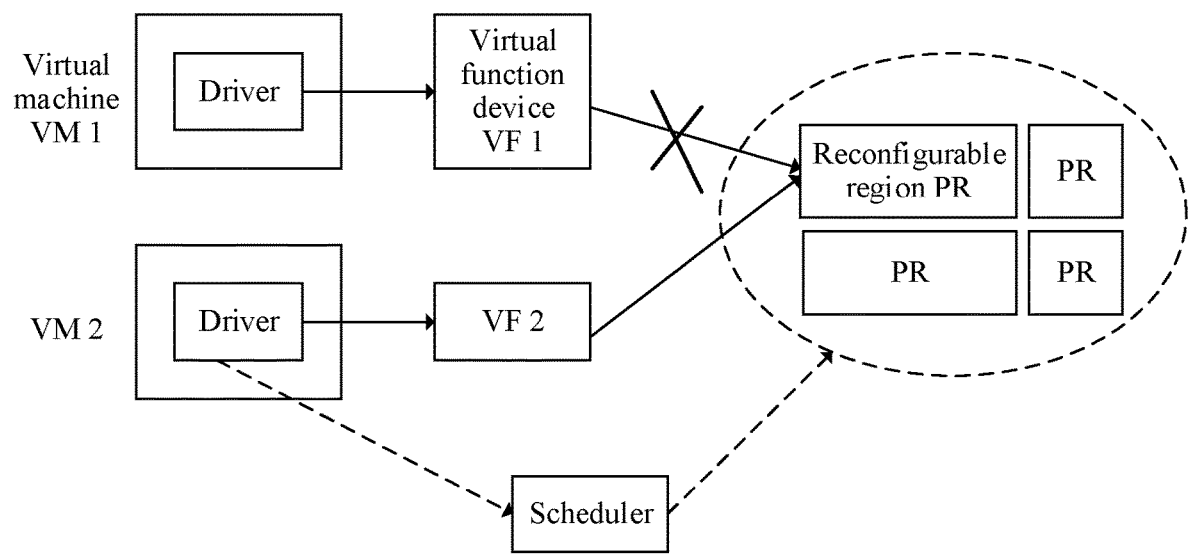
FIG. 6 is a schematic diagram of a VD scheduling behavior model according to an embodiment of this application.

FIG. 6 is a schematic diagram of a VD scheduling behavior model. Two to-be-scheduled subjects in this model are a VD and a PR. As shown in the figure, a function of the VD needs to be implemented in PR logic. Before a VD to which no PR is allocated works normally, the VD needs to send a PR request message to request a PR resource. In this process, a VD driver needs to communicate with an agent unit on a host end to apply for the PR logic and synchronize device information. Then, the agent unit cooperates with a scheduler of an FPGA device to schedule the PR logic based on a scheduling algorithm. There are two PR logic scheduling manners. In a first manner, if there is an idle PR, the idle PR is re-allocated. In a second manner, if there is no idle PR, a running PR of another VD needs to be preempted.

A VD device state is stored in a VM driver to record whether a current VD is available, whether a PR request is sent, and the like. Possible states of the VD are shown in Table 1.

TABLE 1

| Device state | Descriptions |
| --- | --- |
| Device available | The device is available. |
| Device non-available | The device is unavailable and stops reading/writing a register of the device. |
| Device waiting | The device is unavailable. A request has been sent to the agent and the device is waiting for allocation. |

A state of the PR is stored in the scheduler of the FPGA device and is used to record whether the PR is running, being preempted, being switched, available, and the like. Possible states of the PR are shown in Table 2.

TABLE 2

| PR state | Descriptions |
| --- | --- |
| Idle | The PR logic is idle and no operation is being performed. |
| Running | The PR logic is performing an operation normally. |
| In pre-emption | The PR logic is being preempted, and an operation is terminated after a nearest check-point is reached. |
| In switch | Translating a mapping relationship between the PR logic and a VF, including context switching and VF-PR channel reconfiguration |
| Ready | The PR logic has been properly allocated and is available. |

Figure 7:
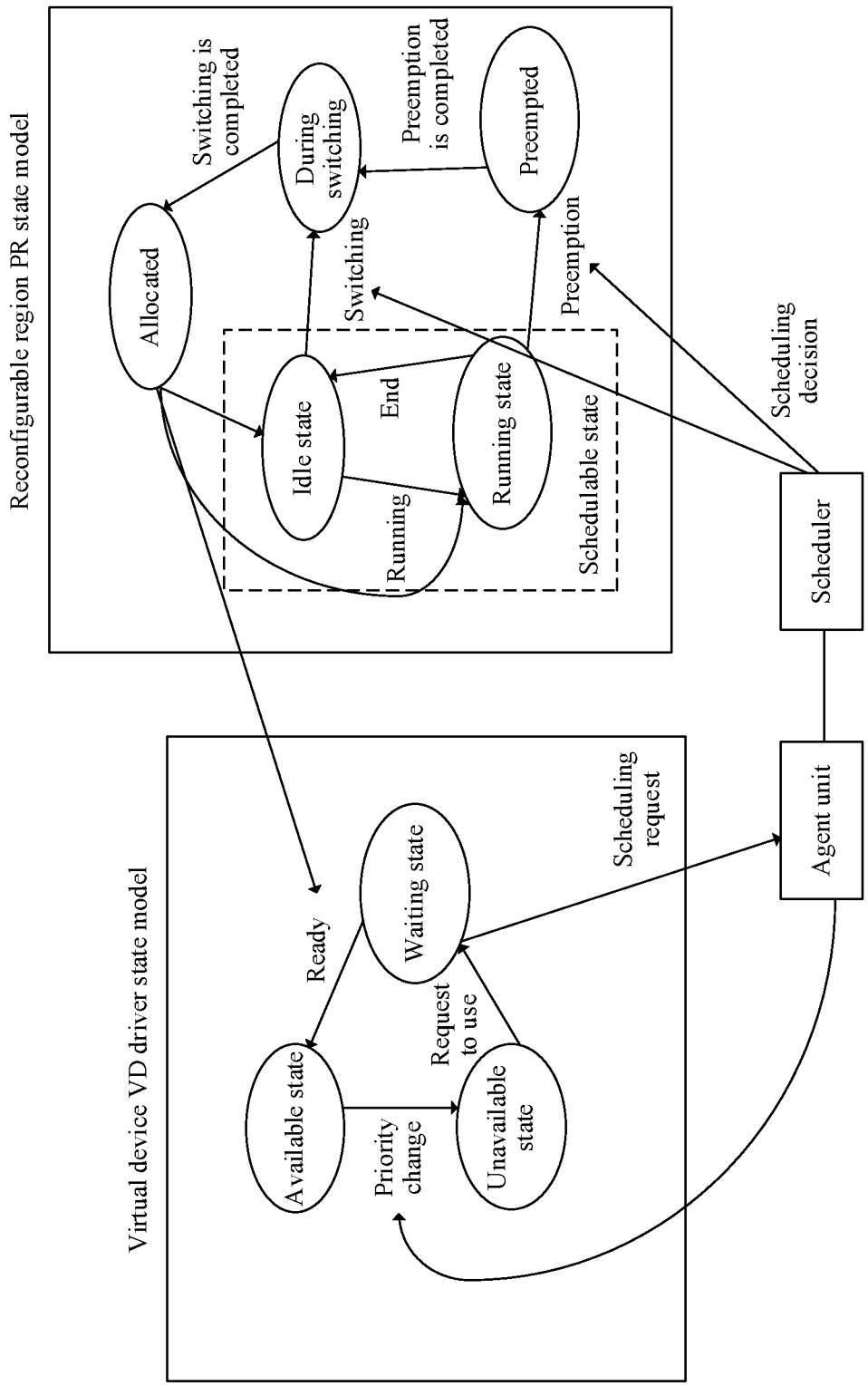
FIG. 7 is a schematic diagram of state transition of a scheduling behavior model according to an embodiment of this application.

Based on the VD device state and the PR state defined above, a state machine may be used to describe device scheduling behavior. A state transition diagram of the state machine is shown as a scheduling behavior model state transition diagram shown in FIG. 7. The state transition diagram includes two parts: a VD state model and a PR state model. The two parts interact with each other using the agent unit and the scheduler.

For the VD state model, there are three cases:

Device available: A VD device is available. A driver can read/write a VD register. After being preempted, a state of the VD device changes to device non-available.

Device non-available: A VD device is unavailable. A driver is prohibited from reading/writing a VD register. After the driver sends a PR request, a state of the VD device changes to device waiting.

Device waiting: A VD device is currently unavailable, but has sent a PR request and is waiting for PR resource allocation. After receiving a Device READY signal sent by the agent unit, a state of the VD device changes to device available.

For the PR state model, there are five cases:

Idle: PR logic is in an idle state. When an operation command of a VD is received, the PR logic switches to a running state, or when a switching command is received, the PR logic switches to an in switch state.

Running: PR logic is performing an operation. After the operation is completed, the PR logic switches to an idle state, or PR logic switches to an in preemption state after being preempted.

In preemption: PR logic is being preempted. After an operation reaches a nearest check-point, the PR logic switches to an in switch state.

In switch: A mapping relationship between PR logic and a VD is being translated, including context switching and VD-PR router channel reconfiguration. After the translation is completed, the PR logic switches to a ready state.

Ready: PR logic has been mapped and bound to a VD and corresponding VD context has been loaded. After receiving an operation command of the VD, the PR logic switches to a running state, or switches to an idle state if the PR logic is not used for a long time.

In a possible implementation solution, the PR resource is allocated using a scheduling algorithm based on a unified priority of the device, a priority value is set and maintained for each VD using the scheduling algorithm, and a scheduling decision is determined using the priority value of the VD. The following describes a hardware implementation principle, an overall scheduling policy, a priority calculation method, and algorithm features in detail.

Figure 8:
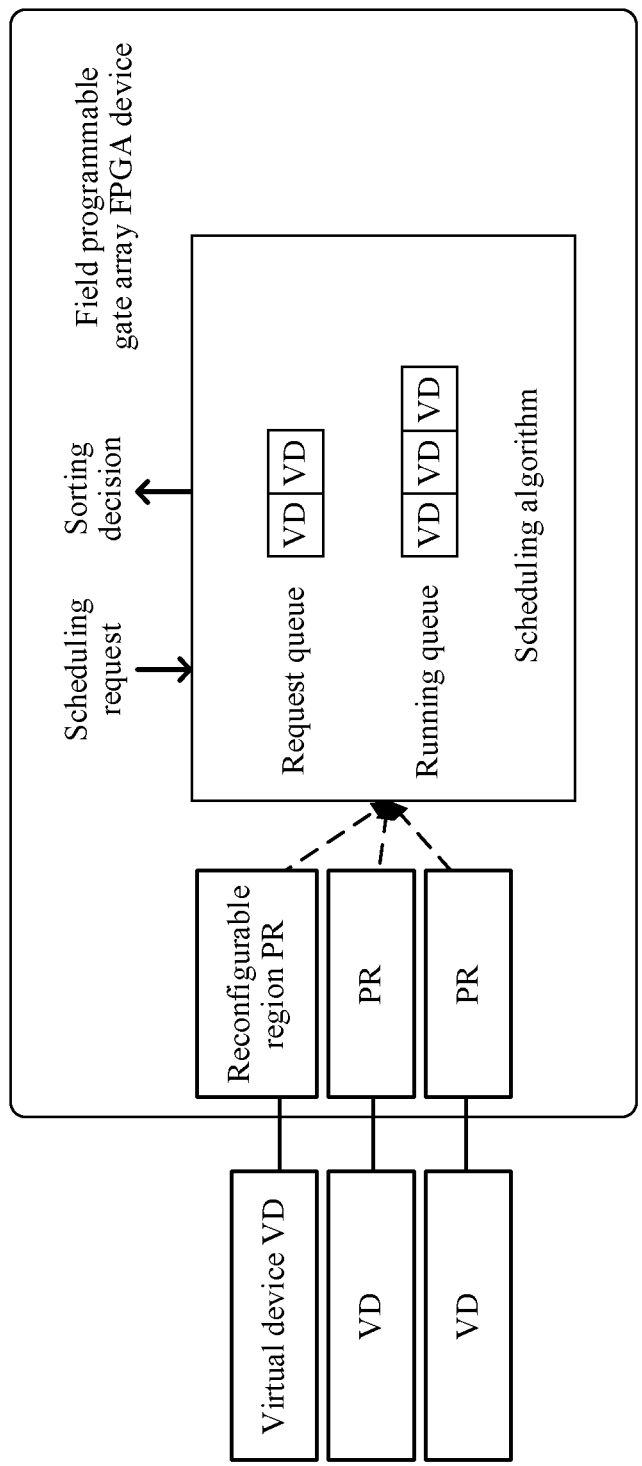
FIG. 8 is a schematic diagram of a PR scheduling algorithm according to an embodiment of this application.

FIG. 8 shows the hardware implementation principle. A scheduling algorithm is implemented as hardware module logic and can be dynamically upgraded (reconfigurable). In the scheduling algorithm, two priority queues are mainly maintained: a request queue and a running queue. The request queue stores a number of a VD to which a PR needs to be allocated and a priority value of the VD, and the running queue stores a number of a running VD and a priority value of the VD. In addition, a scheduling algorithm module obtains a running parameter of a PR through a unified interface, dynamically adjusts the priority value of the VD, and performs a scheduling operation.

When a PR request is initiated, the following three levels of determining are performed.

If there is an idle PR, the idle PR is preferentially allocated. If all PRs are in a busy state and a preemption condition shown in the following formula is met, $VD_i$ with a lowest preemption priority (P+Δ cos t) is preempted. Further:

$$P_{request} > \min_{VD_i \in running\ queue}\{P_i + \Delta \cos t_i\}, \text{ and}$$

$$\Delta \cos t_i = \Delta \cos t_i^{switch} + \Delta \cos t_i^{preempt} + \Delta \cos t_i^{reconfig}.$$

$P_{request}$ represents a priority value of a VD that sends the PR request, $P_1$ represents a priority value of the VD in the running queue, $\Delta \cos t_i$ represents a preemption cos t correction value, and $\Delta \cos t_i$ quantifies, in a unified manner, extra overheads caused by preemption behavior, $\Delta \cos t_i^{switch}$ is used to describe state transition overheads of a PR register. $\Delta \cos t_i^{preempt}$ is used to describe overheads generated by stopping an operation that is being executed. $\Delta \cos t_i^{preempt}$ is related to an algorithm that is being executed by the VD and a state of the algorithm, and $\Delta \cos t_i^{reconfig}$ is used to describe overheads generated by reconstructing PR logic, and $\Delta \cos t_i^{reconfig}$ is related to a type of PR logic to be loaded.

If all the PRs are in the busy state and the PR preemption condition is not met, the request is added to the request queue (request queue). In addition, whether the following formula is true is checked in each clock cycle:

$$\max_{VD_j \in request\ queue} P_j > \min_{VD_i \in running\ queue}\{P_i + \Delta \cos t_i\},$$

where $P_i$ represents a priority value of the VD in the running queue.

If the condition is met, a PR resource is allocated to a VD that satisfies the condition.

Figure 9:
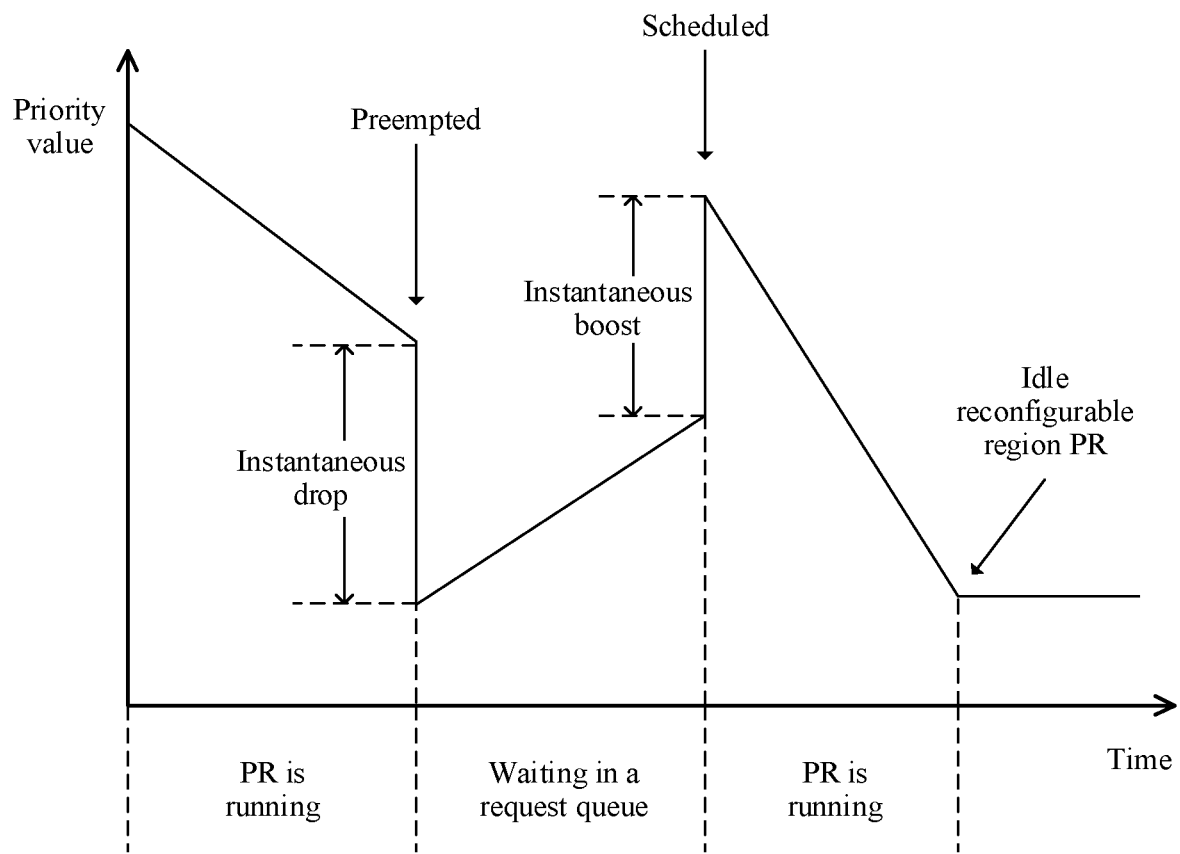
FIG. 9 is a schematic diagram of a change status of a priority value of a VD according to an embodiment of this application.

It should be noted that, a rule for calculating the priority value of the VD is as follows Initial priority values of VD devices of all VMs are equal, a priority value boosts with an accumulated time of a VD device in the request queue, and the priority value drops with an accumulated running time of the VD device. The running time herein is a time consumed by the VD to perform an actual operation, that is, a time in which a PR is in a busy state. To prevent a resource of the VD from being excessively frequently preempted, each time after the resource of the VD is scheduled, the priority value of the VD is instantaneously boosted by a first preset threshold. Conversely, each time the resource of the VD is preempted for another VD, the priority value of the VD is instantaneously dropped by a second preset threshold. In this scheduling algorithm, a scheduling decision is made only based on difference between priority values of VDs. Therefore, after a fixed period of time, the priority values of the VDs are processed in a unified manner, and only the differences between the priority values of the VDs are retained. FIG. 9 shows a change status of a priority value of each VD. The figure is a qualitative analysis diagram. A rate at which a priority is boosted/dropped and an instantaneous adjustment value when the priority is boosted/dropped need to be adapted and adjusted based on a specific application scenario.

505: The scheduler sends a preemption notification to the agent unit. The agent unit receives the preemption notification sent by the scheduler.

The preemption notification indicates that the PR that serves the second VD needs to be preempted as the target PR.

506: The agent unit sends suspend information to a second VM based on the preemption notification. The second VM receives the suspend information sent by the agent unit.

The second VM is a VM configured corresponding to the second VD, and the suspend information is used to indicate the second VM to suspend using the second VD.

507: The second VM sends suspend acknowledgment information to the agent unit. The agent unit receives the suspend acknowledgment information sent by the second VM.

The suspend acknowledgment information is used to indicate that the second VM has suspended using the second VD.

508: The agent unit sends indication information to the scheduler based on the suspend acknowledgment information. The scheduler receives the indication information sent by the agent unit.

The indication information is used to indicate that the second VM has suspended using the second VD.

509: When the PR that serves the second VD runs to a preset check-point, the scheduler stops the PR that serves the second VD from serving the second VD.

When the scheduler needs to preempt the PR that serves the second VD to serve the first VD, the scheduler does not immediately stop running of the PR that serves the second VD, but as described above, when the PR that serves the second VD runs to the preset check-point (the check-point described above), the scheduler stops the PR that serves the second VD.

510: The scheduler deploys context content of the first VD in the target PR.

For detailed content, refer to step 205 in the embodiment of FIG. 2, and details are not described herein again.

511: The scheduler connects the target PR to a first VF corresponding to the first VD.

In this application, as shown in FIG. 1, a correspondence between the plurality of VDs and the plurality of PRs includes a mapping relationship (as described above) between the plurality of VDs and a plurality of VFs, and a connection relationship (the configurable VF-PR router described above) between the plurality of VFs and the plurality of PRs. The plurality of VDs includes the first VD, and the plurality of PRs include the target PR. The mapping relationship between the plurality of VDs and the plurality of VFs is a static mapping relationship. The connection relationship between the plurality of VFs and the plurality of PRs is a dynamic connection relationship.

This application provides the configurable VF-PR router, to implement dynamic mapping at a hardware layer between a PR module and a VF interface. In this solution, a pass-through relationship between the VM and the VF remains unchanged in a life cycle of the VM. Therefore, the VDs correspond one-to-one to the VFs. The configurable router resolves a mapping connection at the hardware layer between the PR and the VF. A VF device resource (such as device configuration space, base address register (BAR) space, and a PR resource) is dynamically configured and connected such that a VF device function can be scheduled between different PRs.

A configurable channel serves as an intermediate layer between the VF interface and a PR computing resource, is responsible for maintaining the mapping relationship between the VF and the PR, and is responsible for redirecting an operation of accessing the VF device. In this technology, the VF is responsible for PCIe bus communication of the FPGA device, the PR is responsible for an actual acceleration operation, and the configurable channel complies with a general PCIe data transmission interface of the FPGA device, is presented as a standard SR-IOV VF device to an upstream device, and implements dynamic mapping of lower-layer acceleration logic (PR).

In an existing FPGA device servitization solution, an FPGA resource is statically allocated to a VM tenant, and is bound to a life cycle of the VM. The VM is statically connected to a PR of an underlying FPGA device through a PCIe interface. In this application, a plurality of dynamic configurable connection mechanisms are introduced to a connection channel between the VM and the PR resource. The mechanisms include dynamic hot plug between the VD and the VF, and the configurable router between the VF and the PR. According to the mechanisms, the VM and the underlying PR resource are dynamically configured.

During configuration between the FPGA device and a host, persons skilled in the art may implement the configuration between the FPGA device and the host using the following steps.

Step 1: Insert an FPGA device card into a PCIe slot of the host and load a logic instruction of a function of the foregoing designed FPGA device in this application.

Step 2: Install the foregoing agent unit in this application in an operating system of the host to monitor a state of the FPGA device and communicate with a user (the VM).

Step 3: On a user VM side, install a corresponding driver designed in this application to implement a function of the VD device.

Step 4: An operating system on the user side can implement the solution of this application after correctly identifying the VD device.

Figure 10:
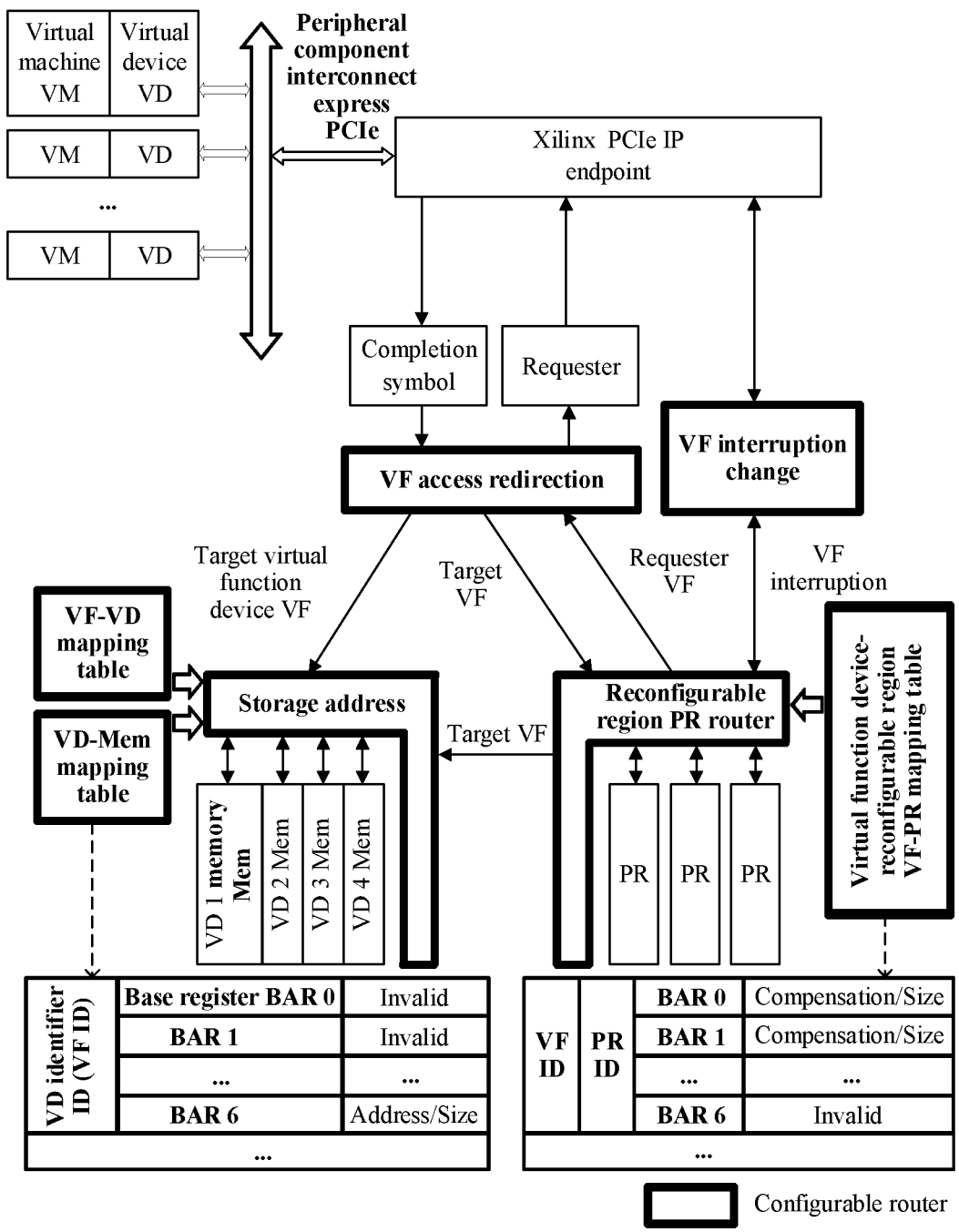
FIG. 10 is a schematic architectural diagram of a configurable VF-PR channel according to an embodiment of this application.

The following describes, using an example, an implementation in which a configurable VF-PR channel is configured on an FPGA device in the solution of this application. FIG. 10 shows a configurable VF-PR channel implemented based on an SR-IOV technology of XILINX. The entire FPGA device is connected to a PCIe bus as a PCIe endpoint device through a XILINX PCI-Express Internet Protocol (IP) module. The PCIe IP module complies with the SR-IOV protocol and is presented as a plurality of VF devices outside. In the FPGA device, the PCIe IP module communicates with a downstream module through a unified Advanced eXtensible Interface (AXI)-Stream interface, and data is encapsulated in a format of an AXI-Stream packet for transfer. A header of a data packet includes detailed information for data transfer. The downstream module parses the header and distributes the data packet to different VFs, to complete access of the PCIe bus to the VF device. Similarly, a request for accessing the VF is encapsulated, and is sent to the PCIe bus in a form of the data packet, to complete access of the VF device to the PCIe bus.

The PCIe IP module communicates with the PCIe bus in either of the following two modes:

(1) Completer mode: As a slave device of the bus, a PCIe device completes a read/write operation delivered by the PCIe bus. This mode corresponds to access of a host or another device to BAR space of the PCIe device.

(2) Requester mode: As a master device of the bus, a PCIe device actively initiates a read/write operation to a host or another device on the PCIe bus. This mode corresponds to DMA access initiated by the PCIe device.

In conclusion, communication between the VF device and the PCIe bus is implemented using a series of completer/requester packages. In the present disclosure, a completer module and a requester module are used to manage bus communication of each VF device. The completer module is responsible for processing a read/write request of a host for VF BAR space, and the requester module is responsible for processing a DMA operation initiated by the VF device.

The PCIe IP module and the completer/requester module together constitute an interface layer of the VF device. In the present disclosure, configurable router logic, that is, a part marked with a shadow in FIG. 10, is introduced between the interface layer and PR logic.

A VF access redirection module is responsible for redirecting access to the VF device. This module distributes the read/write request delivered by the PCIe bus to BAR space of a target VF. A corresponding component is a register in a PR or memory space of the VF. This module also receives a read/write request of a VF for the PCIe bus and uploads the request to the requester module.

A VF interrupt redirection module directly communicates with the PCIe IP module, and is responsible for managing and forwarding a VF interrupt signal (INTx/Message Signalled Interrupts (MSI)/MSI (Extended) (MSI-X)).

A PR router module is responsible for translating mapping between the PR logic and the VF. Access of an upstream module to the VF device, such as access to BAR space, is routed to a PR through the PR router. Similarly, access of the PR logic to another module, such as a DMA operation, memory access, and an interrupt request, is converted by the PR router and presented in a form of access to the VF device. The PR router needs to use a VF-PR translation table to complete mapping translation.

The VF-PR translation table is a dynamically configurable mapping table that maintains a mapping relationship between VFs and PRs. In the mapping table, a VF is used as an index value. Each entry records a PR corresponding to the VF and an offset of a BAR space register. When a mapping relationship between a VF and a PR changes, the VF may be associated with a new PR by dynamically modifying a corresponding entry.

A memory access module is responsible for processing access to an FPGA memory. The FPGA memory allocates independent memory space to each VD. The memory access module processes read/write access to the VF device and translates the read/write access to the VF device into a memory address of a corresponding VD.

A VF-VD table maintains a mapping between VFs and VDs. In this solution, the VFs are statically one-to-one mapped to the VDs, and a VF ID is always equal to a VD ID.

By default, a VD-Mem translation table is a static mapping table. That is, memory space allocation for each VD is static and cannot be dynamically adjusted. In this table, a VF is used as an index value. Each entry records a start address and a length of BAR space of the VF in the memory. BAR space that is not implemented in the memory is marked as invalid.

The foregoing components together constitute a configurable VF-PR router. Standard AXI-Stream communication of the PCIe IP module is processed by the router and is redirected to the underlying PR logic and a memory module. The VF is used as a communication object between all components in the configurable router such that a hardware design is greatly simplified and decoupling between the modules is implemented. In this application, complete mapping between a PR and a VF interface can be implemented only by configuring the VF-PR mapping table (VF-PR translation table).

512: The scheduler sends acknowledgment information to the agent unit. The agent unit receives the acknowledgment information sent by the scheduler.

513: The agent unit notifies a first VM to run the first VD.

Figure 11:
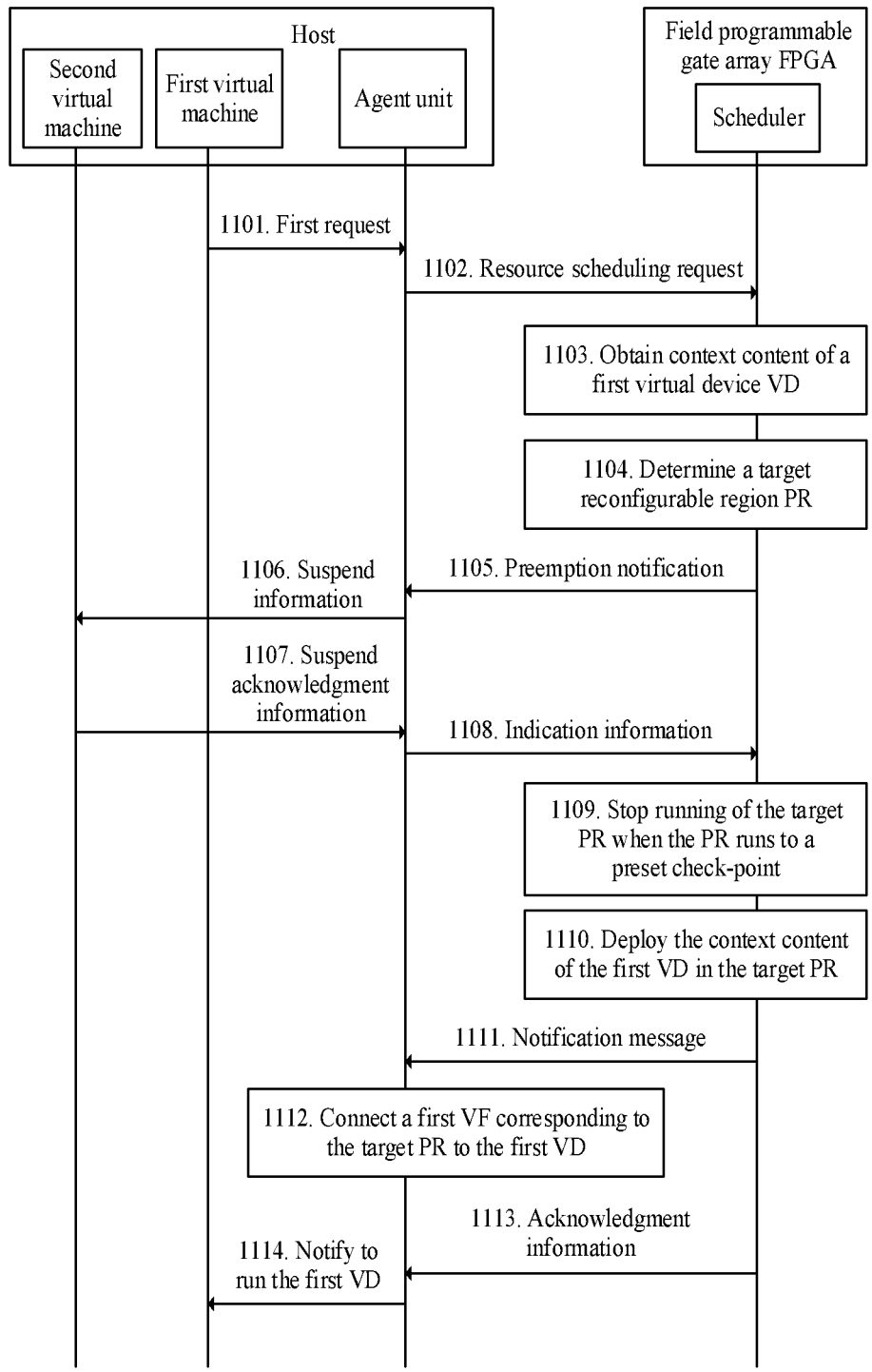
FIG. 11 is a schematic diagram of another embodiment of a resource scheduling algorithm according to this application.

In the embodiment in FIG. 5, a scheduling solution provided when a PR needs to be preempted and a process of a dynamic connection between the PR and a VF are described. In a possible implementation, a connection relationship between the PR and the VF is a static connection relationship, and a mapping relationship between the VD and the VF may be a dynamic mapping relationship. The following uses an example for description. Referring to FIG. 11, another embodiment of a resource scheduling method according to this application includes the following steps.

Content of steps 1101 to 1110 is similar to content of steps 501 to 510 in the embodiment in FIG. 5, and details are not described herein again.

1111: The scheduler sends a notification message to the agent unit. The agent unit receives the notification message sent by the scheduler.

The notification message is used to notify the agent unit to connect a first VF corresponding to the target PR to the first VD.

1112: The agent unit connects the first VF corresponding to the target PR to the first VD.

In this solution, the VF device and the PR resource are in a one-to-one correspondence through a static connection. Dynamic mapping between the VD and the PR is implemented by configuring a VF-VM pass-through channel. The scheduler on a host side dynamically adjusts, by hot plugging the FPGA VF device on a VM, a VF device that is passed through to the VM.

Figure 12:
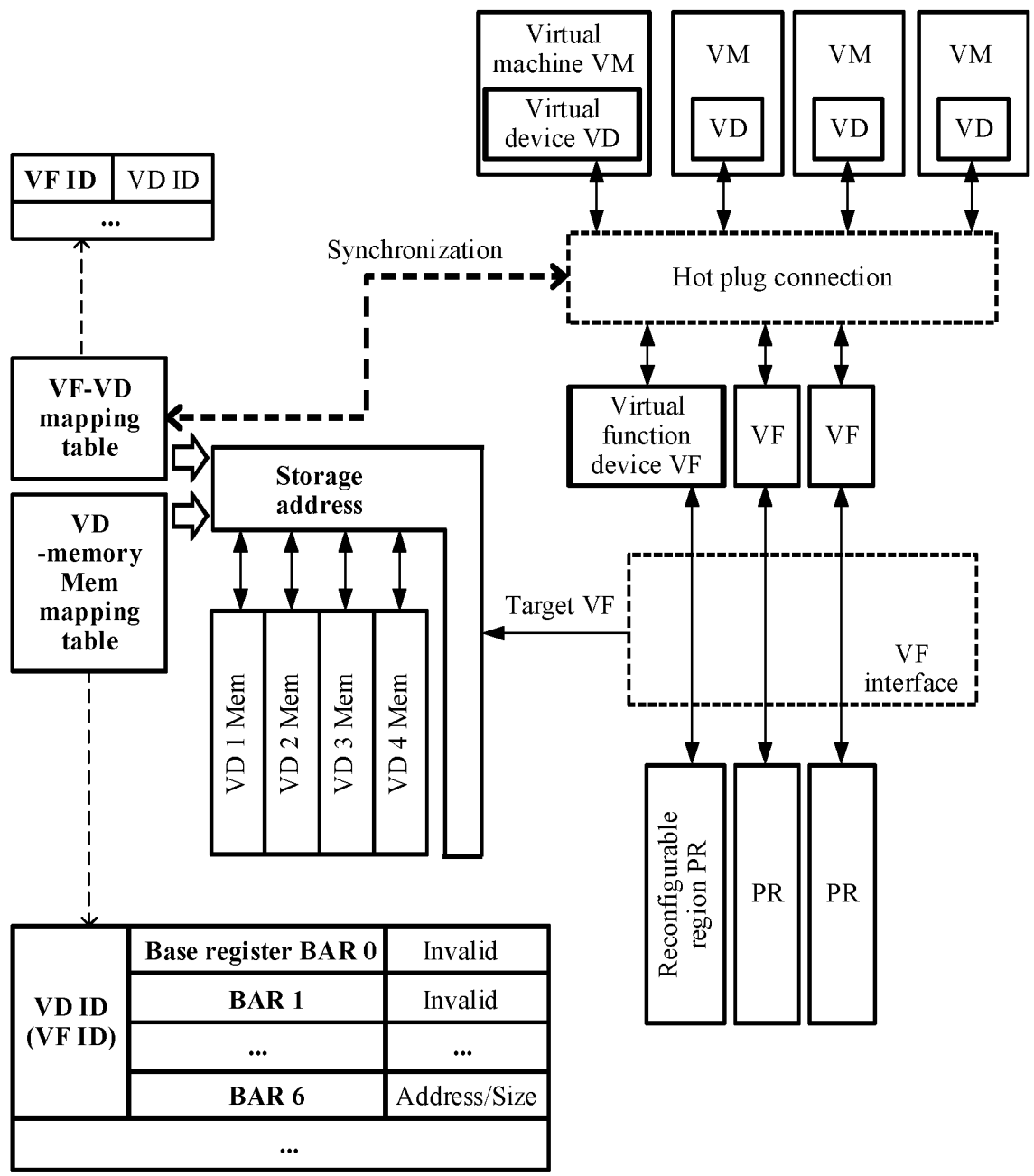
FIG. 12 is a schematic diagram of a VM-VF pass-through framework according to an embodiment of this application.

FIG. 12 shows a connection relationship implemented between a VD and a PR by adjusting a VM-VF pass-through relationship. Using a device hot plug mechanism, different VF devices are allocated to a VD on a VM such that a PR resource corresponding to the VD can be used.

In this solution, address mapping is still performed, using a memory access module, for access to a memory. The mapping is divided into two phases: VF-VD translation (VF-VD Table) and VD-Mem translation (VD-Mem Translation Table).

In this solution, because a mapping relationship between a VF and a VD dynamically changes, the VF-VD Table needs to be dynamically adjusted, that is, a pass-through relationship between the VF and the VD is synchronously updated. The VD-Mem translation table is a static page table that records VD memory space, and is not dynamically modified by default. Access to the VD device is routed to independent memory space of the VD device by processing the two layers of mapping tables.

Content of steps 1113 and 1114 is similar to content of steps 512 and 513 in the embodiment in FIG. 5, and details are not described herein again.

With reference to the embodiment in FIG. 5 and the embodiment in FIG. 11, this application provides two VD-PR channel solutions, and the two VD-PR channel solutions both can implement dynamic configuration and connection between the VD and the PR. In the solution of the embodiment in FIG. 5, the VM-VF pass-through relationship remains statically unchanged, and hardware logic is responsible for switching and scheduling the PR. In this solution, the VF device is not hot plugged, and the VF is always visible to the VM. Therefore, complexity of VD driver development is reduced, but complexity of a hardware design is increased. In the solution of the embodiment in FIG. 11, connection configuration between the VD and the PR is implemented at a software layer, thereby reducing hardware complexity. However, the VD driver in the VM needs to provide an additional processing mechanism for a hot plug case. The two mechanisms in this application may be selected based on different actual application scenarios and constraint conditions.

It should be noted that, in the solution of the embodiment in FIG. 5, the VD-VF pass-through relationship remains statically unchanged, and the PR is switched and scheduled by adjusting the configurable VF-PR router. In the embodiment in FIG. 11, the connection relationship between the VF and the PR remains statically unchanged, and the PR is switched and scheduled by adjusting the VD-VF pass-through relationship. In another possible implementation, both the two layers of correspondences between the VD and the PR may alternatively be set to dynamic relationships. That is, the pass-through relationship between the VD and the VF is a dynamic connection, and the configurable router between the VF and the PR is a dynamic configurable relationship. When both the foregoing two layers of correspondences are dynamic connection relationships, when determining a PR that needs to be scheduled, the scheduler may first complete dynamic configuration between the VF and the PR, to be specific, determine to connect any VF in an idle state in a plurality of VFs to the target PR, and then notify the agent unit on the host side to connect a VD, to be served by the PR that is being scheduled, to the VF that is connected to the target PR and that is determined by the scheduler such that configuration of two layers of dynamic connections between the VD and the PR is implemented.

Figure 13:
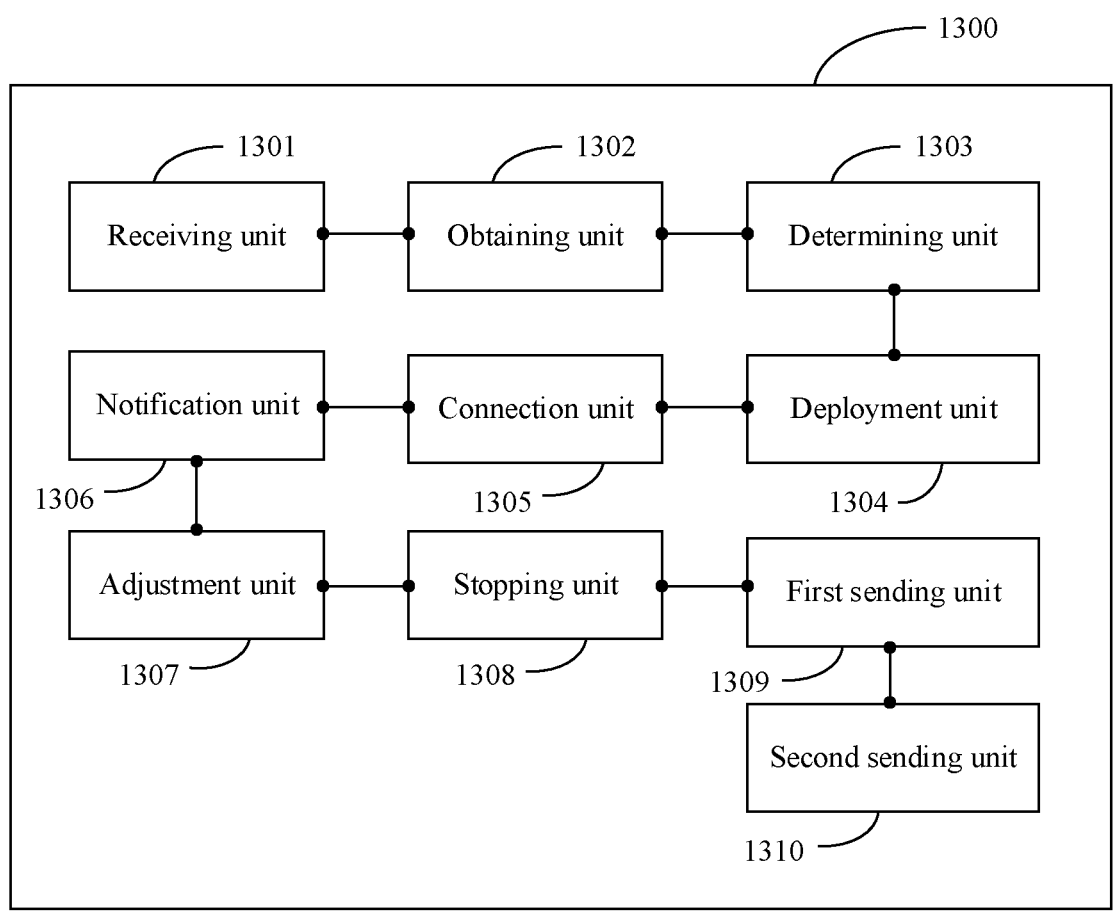
FIG. 13 is a schematic diagram of a resource scheduling apparatus according to an embodiment of this application.

Referring to FIG. 13, an embodiment in FIG. 13 is an embodiment of a resource scheduling apparatus 1300 according to this application. The apparatus 1300 is an FPGA device, and includes a receiving unit 1301 configured to receive a resource scheduling request sent by a host, where the resource scheduling request is used to request to schedule a PR on the FPGA device to serve a first VD, M VDs are deployed on the host, each of the M VDs is configured corresponding to one VM, the first VD is any one of the M VDs, and both N and M are integers greater than 1, an obtaining unit 1302 configured to obtain context content of the first VD based on the resource scheduling request received by the receiving unit 1301, a determining unit 1303 configured to determine a target PR in the N PRs, where the target PR is used to serve the first VD, and a deployment unit 1304 configured to deploy, in the target PR, the context content of the first VD that is obtained by the obtaining unit 1302.

Optionally, N is less than M.

Optionally, K VFs are configured on the apparatus 1300, there is a correspondence between the M VDs and the N PRs, and the correspondence includes a mapping relationship between the M VDs and the K VFs and a connection relationship between the K VFs and the N PRs.

Optionally, the mapping relationship between the M VDs and the K VFs is a static mapping relationship, and the connection relationship between the K VFs and the N PRs is a dynamic connection relationship.

Optionally, the apparatus 1300 further includes a connection unit 1305 that is configured to after the deployment unit 1304 deploys the context content of the first VD in the target PR, connect the target PR to a first VF corresponding to the first VD.

Optionally, the mapping relationship between the M VDs and the K VFs is a dynamic mapping relationship, and the connection relationship between the K VFs and the N PRs is a static connection relationship.

Optionally, the apparatus 1300 further includes a notification unit 1306 that is configured to after the deployment unit 1304 deploys the context content of the first VD in the target PR, notify the host to connect the first VD to a first VF corresponding to the target PR.

Optionally, the mapping relationship between the M VDs and the K VFs is a dynamic mapping relationship, and the connection relationship between the K VFs and the N PRs is a dynamic connection relationship.

Optionally, the connection unit 1305 is further configured to after the deployment unit 1304 deploys the context content of the first VD in the target PR, connect the target PR to a first VF, where the first VF is any VF in an idle state in the K VFs, and the idle state is used to indicate that the VF is not connected to any one of the N PRs, and the notification unit 1306 is further configured to notify the host to connect the first VD to the first VF.

Optionally, the determining unit 1303 is further configured to determine any PR in an idle state in the N PRs as the target PR, where the idle state is used to indicate a state in which a corresponding PR does not serve any one of the M VDs.

Optionally, the determining unit 1303 is further configured to when all the N PRs are in a busy state, determine, based on priority values, a PR that is in the N PRs and that serves a second VD as the target PR, where the busy state is used to indicate a state in which a corresponding PR is serving one of the M VDs, and the priority value is used to indicate a priority of a corresponding VD for requesting to schedule a PR, and the second VD is any VD whose priority value is less than a priority value of the first VD in VDs that are being served by the N PRs.

Optionally, the determining unit 1303 is further configured to when all the N PRs are in the busy state and the second VD does not exist, set a state of the first VD to a waiting state and updating the priority value of the first VD based on waiting duration, where the priority value of the first VD boosts as the waiting duration of the first VD increases, and when a PR in an idle state exists in the N PRs, determine the PR in the idle state as the target PR, where the idle state is used to indicate a state in which a corresponding PR does not serve any one of the M VDs, or when an updated priority value of the first VD boosts and the second VD exists in the N PRs, determine a PR that serves the second VD as the target PR.

Optionally, the second VD is any VD with a sum of a priority value and a preemption cos t correction value being less than the priority value of the first VD in the VDs that are being served by the N PRs, and the preemption cos t correction value is used to indicate overheads required by the first VD to preempt a PR.

Optionally, the apparatus 1300 further includes an adjustment unit 1307 that is configured to after the determining unit 1303 determines, based on the priority values, the PR that is in the N PRs and that serves the second VD as the target PR, boost the priority value of the first VD by a first preset threshold, and drop the priority value of the second VD by a second preset threshold.

Optionally, the apparatus 1300 further includes a stopping unit 1308 that is configured to after the determining unit 1303 determines, based on the priority values, the PR that is in the N PRs and that serves the second VD as the target PR, stop serving the second VD when the PR that serves the second VD runs to a preset check-point, where the preset check-point is a check-point of a logical algorithm path of a process that is run by the PR.

Optionally, the apparatus 1300 further includes a first sending unit 1309 that is configured to before the stopping unit 1308 stops the PR service that serves the second VD, send a preemption notification to the host, where the preemption notification is used to indicate that the PR that serves the second VD needs to be preempted as the target PR, and the receiving unit 1301 is further configured to after the first sending unit sends the preemption notification to the host, receive indication information sent by the host, where the indication information is used to indicate that a VM configured corresponding to the second VD has suspended using the second VD.

Optionally, the apparatus 1300 further includes a second sending unit 1310 that is configured to after the deployment unit 1304 deploys the context content of the first VD in the target PR, send acknowledgment information to the host, where the acknowledgment information is used to indicate that the context content of the first VD has been deployed in the target PR such that a VM configured corresponding to the first VD runs the first VD.

Optionally, the resource scheduling request includes an identifier of the first VD, and the obtaining unit 1302 is further configured to obtain the context content of the first VD from an external memory based on the identifier of the first VD, where the context content includes a PR logic function corresponding to the first VD, a register state of PR logic, and a data state of the first VD.

When the units described in the embodiment in FIG. 13 are running, the steps performed by the FPGA device that are described in the embodiments in FIG. 2, FIG. 5, and FIG. 11 may further be performed. For detailed content, refer to the embodiments in FIG. 2, FIG. 5, and FIG. 11, and details are not described herein again.

Figure 14:
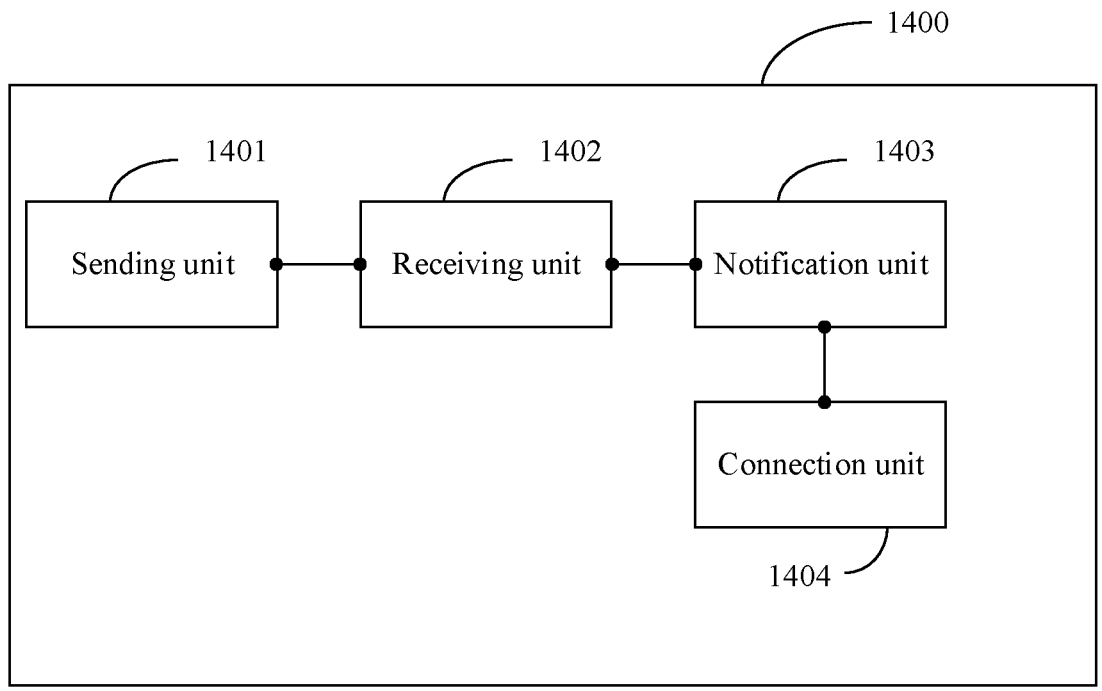
FIG. 14 is another schematic diagram of a resource scheduling apparatus according to an embodiment of this application.

FIG. 14 is a schematic diagram of a resource scheduling apparatus 1400 according to an embodiment of this application. The apparatus 1400 is a host, and the apparatus 1400 includes a sending unit 1401 configured to send a resource scheduling request to an FPGA device, where the resource scheduling request is used to request to schedule a dynamic reconfigurable region PR on the FPGA device to serve a first VD, the FPGA device includes N PRs, M VDs are deployed on the host, each of the M VDs is configured corresponding to one VM, the first VD is any one of the M VDs, and both N and M are integers greater than 1, a receiving unit 1402 configured to after the sending unit 1401 sends the resource scheduling request to the FPGA device, receive acknowledgment information sent by the FPGA device, where the acknowledgment information is used to indicate that context content of the first VD has been deployed in a target PR, and the target PR is a PR scheduled by the FPGA device for the first VD, and a notification unit 1403 configured to notify a first VM to run the first VD, where the first VM is a VM configured corresponding to the first VD.

Optionally, N is less than M.

Optionally, K VFs are configured on the FPGA device, there is a correspondence between the M VDs and the N PRs, and the correspondence includes a mapping relationship between the M VDs and the K VFs and a connection relationship between the K VFs and the N PRs.

Optionally, the mapping relationship between the M VDs and the K VFs is a static mapping relationship, and the connection relationship between the K VFs and the N PRs is a dynamic connection relationship.

Optionally, the mapping relationship between the M VDs and the K VFs is a dynamic mapping relationship, and the connection relationship between the K VFs and the N PRs is a static connection relationship.

Optionally, the mapping relationship between the M VDs and the K VFs is a dynamic mapping relationship, and the connection relationship between the K VFs and the N PRs is a dynamic connection relationship.

Optionally, the apparatus 1400 further includes a connection unit 1404 that is configured to before the notification unit 1403 notifies the first VM to run the first VD, connect the first VD to a first VF corresponding to the target PR.

Optionally, the receiving unit 1402 is further configured to before receiving the acknowledgment information sent by the FPGA device, receive a preemption notification sent by the FPGA device, where the preemption notification indicates that a PR that serves a second VD needs to be preempted as the target PR, and the notification unit 1403 is further configured to send, based on the preemption notification received by the receiving unit 1402, suspend information to a VM configured corresponding to the second VD, where the suspend information is used to indicate the VM configured corresponding to the second VD to suspend using the second VD.

Optionally, the receiving unit 1402 is further configured to after the sending unit 1401 sends, based on the preemption notification, the suspend information to the VM configured corresponding to the second VD, receive suspend acknowledgment information sent by the VM configured corresponding to the second VD, where the suspend acknowledgment information is used to indicate that the VM configured corresponding to the second VD has suspended using the second VD, and the sending unit 1401 is further configured to send indication information to the FPGA device based on the suspend acknowledgment information received by the receiving unit 1402, where the indication information is used to indicate that the VM configured corresponding to the second VD has suspended using the second VD.

When the units described in the embodiment in FIG. 14 are running, the steps performed by the host that are described in the embodiments in FIG. 2, FIG. 5, and FIG. 11 may further be performed. For detailed content, refer to the embodiments in FIG. 2, FIG. 5, and FIG. 11, and details are not described herein again.

The apparatus in the embodiment in FIG. 13 further has an embodiment in another form.

Figure 15:
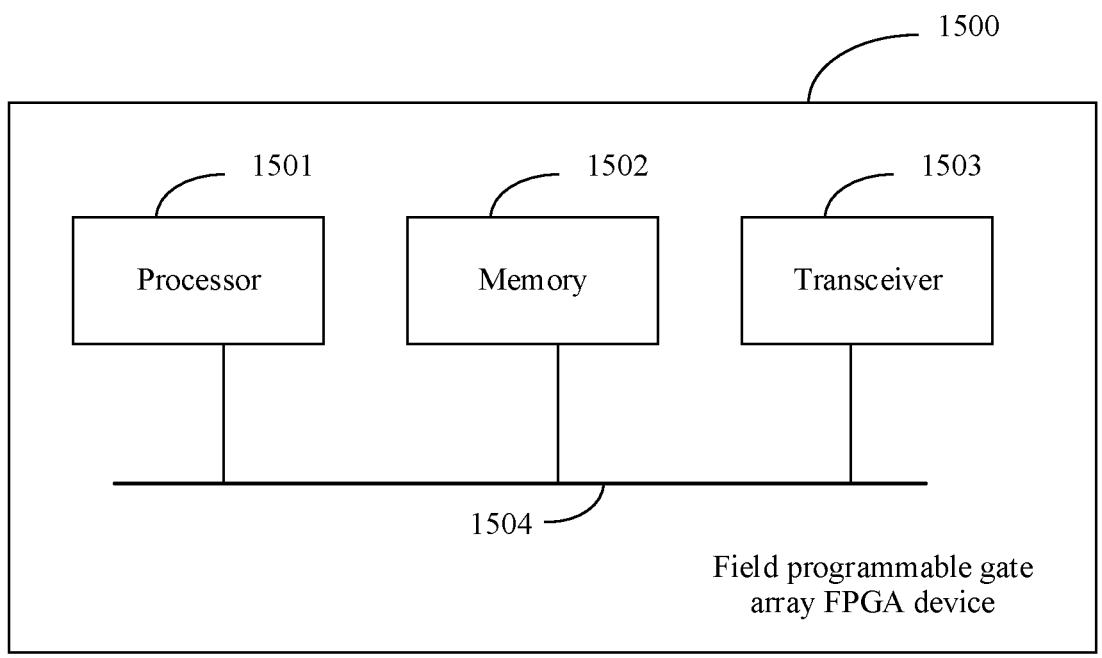
FIG. 15 is still another schematic diagram of a resource scheduling apparatus according to an embodiment of this application.

Referring to FIG. 15, a resource scheduling apparatus 1500 provided in an embodiment of this application is described using an example. The apparatus is an FPGA device. The apparatus 1500 includes a processor 1501, a memory 1502, and a transceiver 1503. The processor 1501, the memory 1502, and the transceiver 1503 are connected using a bus 1504. The transceiver 1503 may include a transmitter and a receiver. The memory 1502 stores a computer instruction. The processor 1501 executes the computer instruction to implement the steps performed by the FPGA device in the embodiments in FIG. 2, FIG. 5, and FIG. 11.

The apparatus in the embodiment in FIG. 14 further has an embodiment in another form.

Figure 16:
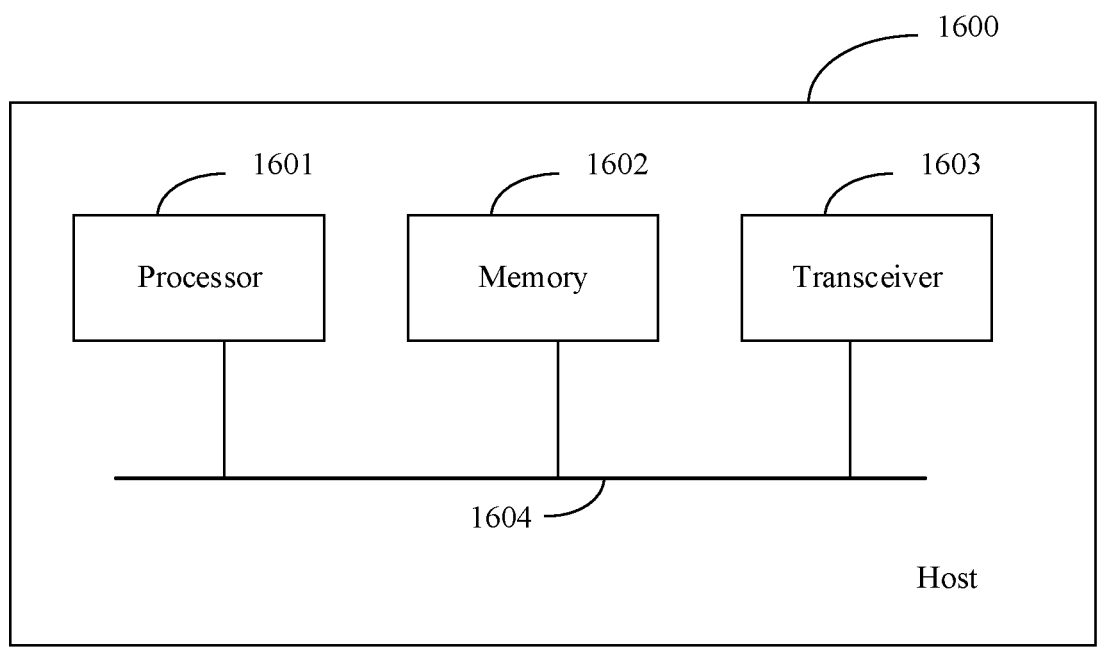
FIG. 16 is yet another schematic diagram of a resource scheduling apparatus according to an embodiment of this application.

Referring to FIG. 16, a resource scheduling apparatus 1600 provided in an embodiment of this application is described using an example. The apparatus is a host. The apparatus 1600 includes a processor 1601, a memory 1602, and a transceiver 1603. The processor 1601, the memory 1602, and the transceiver 1603 are connected using a bus 1604. The transceiver 1603 may include a transmitter and a receiver. The memory 1602 stores a computer instruction. The processor 1601 executes the computer instruction to implement the steps performed by the host in the embodiments in FIG. 2, FIG. 5, and FIG. 11.

In another possible design, when the apparatus is a chip in a device, the chip includes a processing unit and a communications unit. The processing unit may be, for example, a processor. The communications unit may be, for example, an input/output interface, a pin, or a circuit. The processing unit may execute a computer-executable instruction stored in a storage unit such that the chip in the device performs any resource scheduling method in the foregoing embodiments. Optionally, the storage unit is a storage unit in the chip, for example, a register or a buffer, or the storage unit may be a storage unit in a terminal but outside the chip, for example, a read-only memory (ROM), another type of static storage device capable of storing static information and instructions, or a random-access memory (RAM).

The processor mentioned in any of the foregoing designs may be a general-purpose central processing unit (CPU), a microprocessor, an application-specific integrated circuit (ASIC), or one or more integrated circuits for controlling program execution of the resource scheduling method according to the first aspect.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, some or all of the procedures or functions according to the embodiments of the present disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. These modifications or replacements do not make the essence of the corresponding technical solutions depart from the scope of the technical solutions of the embodiments of this application.

What is claimed is:

1. A resource scheduling method implemented by a field programmable gate array (FPGA) device, wherein the resource scheduling method comprises:
   receiving a resource scheduling request from a host, wherein the resource scheduling request requests to schedule a partial region (PR) on the FPGA device to serve a first virtual device (VD) of the host, wherein the FPGA device comprises N PRs, wherein the host comprises M VDs, wherein each of the M VDs corresponds to one virtual machine (VM), wherein the first VD is one of the M VDs, and wherein both N and M are integers greater than one;
   storing a correspondence between the M VDs and the N PRs, wherein the correspondence comprises a mapping relationship between the M VDs and K virtual functions (VFs) on the FPGA device and a connection relationship between the K VFs and the N PRs;
   obtaining context content of the first VD based on the resource scheduling request;
   determining a target PR in the N PRs, wherein the target PR serves the first VD; and
   deploying the context content in the target PR.

2. The resource scheduling method of claim 1, wherein the mapping relationship is a static mapping relationship, and wherein the connection relationship is a dynamic connection relationship.

3. The resource scheduling method of claim 2, wherein after deploying the context content in the target PR, the resource scheduling method further comprises connecting the target PR to a first VF corresponding to the first VD.

4. The resource scheduling method of claim 1, wherein the mapping relationship is a dynamic mapping relationship, and wherein the connection relationship is a static connection relationship.

5. The resource scheduling method of claim 4, wherein after deploying the context content in the target PR, the resource scheduling method further comprises notifying the host to connect the first VD to a first VF corresponding to the target PR.

6. The resource scheduling method of claim 1, wherein the mapping relationship is a dynamic mapping relationship, and wherein the connection relationship is a dynamic connection relationship.

7. The resource scheduling method of claim 6, wherein after deploying the context content in the target PR, the resource scheduling method further comprises:
   connecting the target PR to a first VF, wherein the first VF is in an idle state in the K VFs, and wherein the idle state indicates that a corresponding VF is not connected to any of the N PRs; and
   notifying the host to connect the first VD to the first VF.

8. The resource scheduling method of claim 1, further comprising determining a PR in an idle state in the N PRs as the target PR, wherein the idle state is a state in which a corresponding PR does not serve any of the M VDs.

9. A field-programmable gate array (FPGA) device comprising:
   a memory configured to store computer instructions; and
   a processor coupled to the memory, wherein the computer instructions cause the FPGA device to be configured to:
      receive a resource scheduling request from a host, wherein the resource scheduling request requests to schedule a partial region (PR) on the FPGA device to serve a first virtual device (VD) of the host, wherein the FPGA device comprises N PRs, wherein the host comprises M VDs, wherein each of the M VDs corresponds to one virtual machine (VM), wherein the first VD is one of the M VDs, and wherein both N and M are integers greater than one;
      store a correspondence between the M VDs and the N PRs, wherein the correspondence comprises a mapping relationship between the M VDs and K virtual functions (VFs) on the FPGA device and a connection relationship between the K VFs and the N PRs;
      obtain context content of the first VD based on the resource scheduling request;
      determine a target PR in the N PRs, wherein the target PR serves the first VD; and
      deploy the context content in the target PR.

10. The FPGA device of claim 9, wherein the mapping relationship is a static mapping relationship, and wherein the connection relationship is a dynamic connection relationship.

11. The FPGA device of claim 9, wherein after deploying the context content in the target PR, the computer instructions further cause the FPGA device to connect the target PR to a first VF corresponding to the first VD.

12. The FPGA device of claim 9, wherein the mapping relationship is a dynamic mapping relationship, and wherein the connection relationship is a static connection relationship.

13. The FPGA device of claim 12, wherein after deploying the context content in the target PR, the computer instructions further cause the FPGA device to notify the host to connect the first VD to a first VF corresponding to the target PR.

14. The FPGA device of claim 9, wherein the mapping relationship is a dynamic mapping relationship, and wherein the connection relationship is a dynamic connection relationship.

15. A chip comprising:
memory configured to store instructions; and
a processor coupled to the memory and configured to execute the instructions to cause the chip to:
receive a resource scheduling request from a host, wherein the resource scheduling request requests to schedule a partial region (PR) on the FPGA device to serve a first virtual device (VD) of the host, wherein the FPGA device comprises N PRs, wherein the host comprises M VDs, wherein each of the M VDs corresponds to one virtual machine (VM), wherein the first VD is one of the M VDs, and wherein both N and M are integers greater than one;
store a correspondence between the M VDs and the N PRs, wherein the correspondence comprises a mapping relationship between the M VDs and K virtual functions (VFs) on the FPGA device and a connection relationship between the K VFs and the N PRs;
obtain context content of the first VD based on the resource scheduling request;
determine a target PR in the N PRs, wherein the target PR serves the first VD; and
deploy the context content in the target PR.

16. The chip of claim 15, wherein the mapping relationship is a static mapping relationship, and wherein the connection relationship is a dynamic connection relationship.

17. The chip of claim 15, wherein after deploying the context content in the target PR, the computer instructions further cause the chip to connect the target PR to a first VF corresponding to the first VD.

18. The chip of claim 15, wherein the mapping relationship is a dynamic mapping relationship, and wherein the connection relationship is a static connection relationship.

19. The chip of claim 18, wherein after deploying the context content in the target PR, the computer instructions further cause the chip to notify the host to connect the first VD to a first VF corresponding to the target PR.

20. The chip of claim 15, wherein the mapping relationship is a dynamic mapping relationship, and wherein the connection relationship is a dynamic connection relationship.

* * * * *